(12) United States Patent
Masuda

(10) Patent No.: US 6,771,897 B2
(45) Date of Patent: Aug. 3, 2004

(54) LENS BARREL AND CAMERA

(75) Inventor: Shinichi Masuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 10/620,223

(22) Filed: Jul. 15, 2003

(65) Prior Publication Data

US 2004/0062534 A1 Apr. 1, 2004

(30) Foreign Application Priority Data

Jul. 24, 2002 (JP) ........................................ 2002-215191

(51) Int. Cl.⁷ ............................................. G03B 15/03
(52) U.S. Cl. ............................. 396/61; 396/64; 396/65
(58) Field of Search ............................. 396/61, 63–70, 396/179

(56) References Cited

U.S. PATENT DOCUMENTS 3,977,014 A * 8/1976 Norris .......................... 396/66
5,960,217 A * 9/1999 Goto ............................ 396/65

FOREIGN PATENT DOCUMENTS

| JP | H9-311364 | 12/1997 | ............ G03B/9/70 |
| JP | 2000-352657 | 12/2000 | ............ G02B/7/10 |
| JP | 2001-42384 | 2/2001 | ............ G03B/9/00 |

* cited by examiner

Primary Examiner—W. B. Perkey
(74) Attorney, Agent, or Firm—Robin, Blecker & Daley

(57) ABSTRACT

The present invention discloses a lens apparatus that can switch the aperture diameter of the light-blocking member using a body structural member constituting a portion of the lens apparatus. The lens apparatus includes a lens unit that is moved in a direction of an optical axis, a light-blocking unit having a plurality of light-blocking members forming an aperture portion through which light passes, and a body structural member. The light-blocking unit and the body structural member move relative to one another in the direction of the optical axis according to a movement of the lens unit, and an aperture diameter of the aperture portion is switched by moving the body structural member between a first position in which the light-blocking members are prevented from opening beyond a predetermined aperture diameter, and a second position in which the light-blocking members are allowed to open beyond a predetermined aperture diameter.

10 Claims, 38 Drawing Sheets

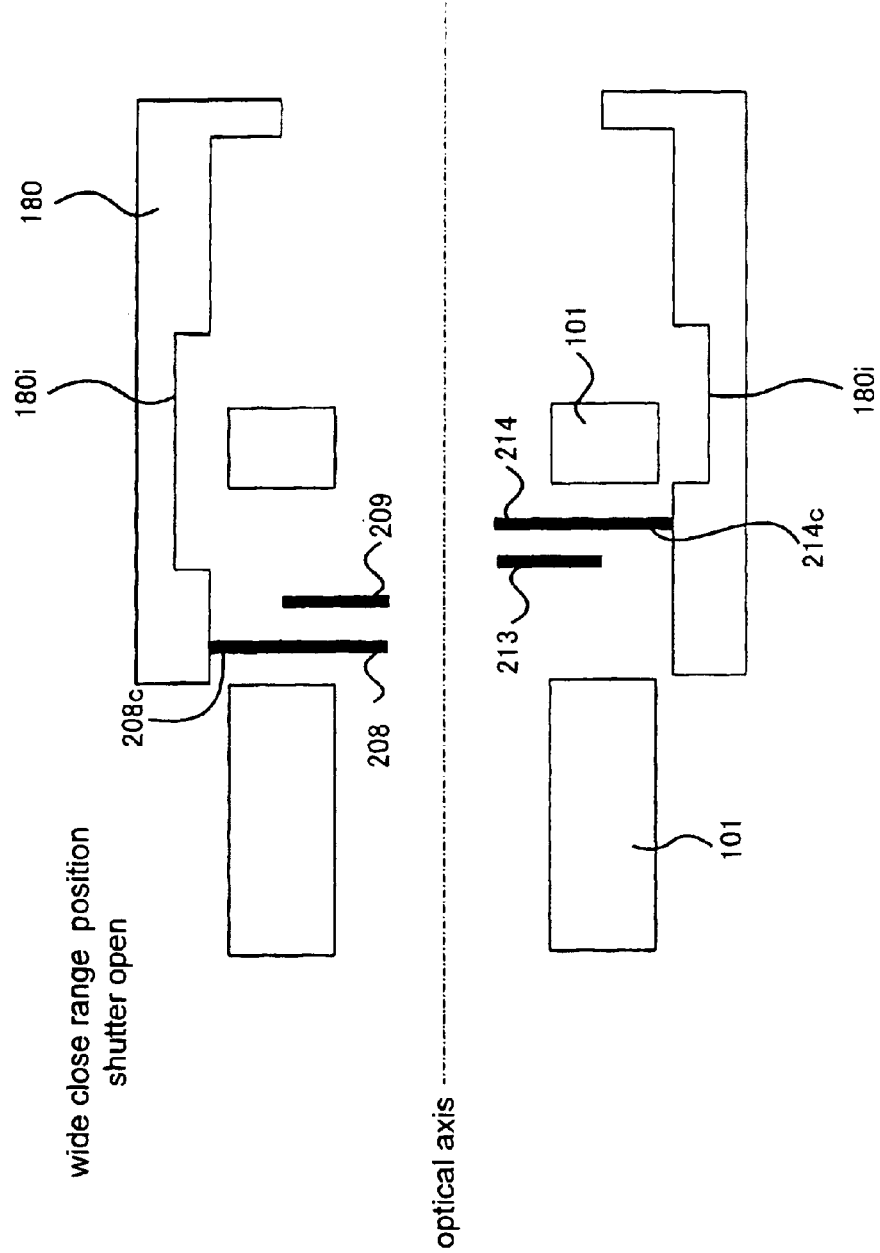

LENS BARREL AND CAMERA

BACKGROUND OF THE INVENTION

1. Field of the Invention

The present invention relates to lens barrels and cameras provided with the same, with which a maximum aperture diameter of light-blocking members can be switched depending on the zoom position. More specifically, the present invention relates to lens barrels and cameras in which the aperture diameter of an aperture portion formed by a plurality of light-blocking members can be changed by obstructing an opening motion of the light-blocking members.

2. Description of Related Art

Aperture stops of conventional light-amount adjusting devices are realized by aperture stop mechanisms made of a plurality of iris blades, or by shutter blades also acting as the aperture stop. With the recent trend towards smaller cameras, almost all lens shutter cameras use shutter blades that also serve as the aperture stop.

On the other hand, in cameras having lens systems with a large zoom ratio, the aperture diameter varies in accordance with the focal length, so that when image-taking is performed with a predetermined aperture diameter, it is necessary to control the opening amount of the shutter blades. For this, the following mechanisms for restricting the opening amount of the shutter blades are known from the related art.

In the zoom lens disclosed in Japanese Patent Laid-Open No. 2000-352657, a mechanism is disclosed, in which a cam member of a rectilinear motion tube rotates a regulation lever inside a shutter block around an axis that is parallel to the optical axis, and the maximum aperture diameter of the shutter blades is restricted by letting the shutter blades abut against this regulation lever.

In the shutter device disclosed in Japanese Patent Laid-Open No. 2001-42384, a regulation member that can rotate around an axis parallel to the optical axis is urged into one direction by a spring, and the aperture stop diameter is switched by controlling the torque of the drive motor for rotating the shutter blades. That is to say, when the torque is greater than the spring force of the spring, then the aperture stop diameter is completely open, and when the torque is less than the spring force of the spring, then the shutter blades abut against the regulation member and are stopped, so that the aperture stop diameter is small.

Furthermore, the shutter device in Japanese Patent Laid-Open No. H09(1997)-311364 discloses a mechanism stopping the rotation of a shutter actuator midway by electric control, and restricting the maximum aperture diameter of the shutter blades.

However, in these examples of related art, components dedicated to the purpose of stopping the drive of the shutter blades midway become necessary, which makes the shutter device and the camera larger and also increases the manufacturing costs. Moreover, in Japanese Patent Laid-Open No. 2000-352657, the member (regulation lever) for, stopping the drive of the shutter blades midway is controlled with a small rotation angle around an axis parallel to the optical axis, so that it is difficult to switch the aperture diameter for each of a plurality of zoom positions, and to increase the precision of the aperture diameter of the shutter blades.

Furthermore, in configurations in which the rotation angle of the actuator driving the shutter blades is directly controlled electrically, as in Japanese Patent Laid-Open No. 1997-311364, the precision of the aperture diameter of the shutter blades becomes poorer than in cases in which the opening motion of the shutter blades is controlled mechanically.

SUMMARY OF THE INVENTION

A lens apparatus in accordance with the present invention includes a lens unit that can be moved in a direction of an optical axis, a light-blocking unit having a plurality of light-blocking members forming an aperture portion through which light passes, and a body structural member constituting a portion of a main body of the lens apparatus, wherein the light-blocking unit and the body structural member are moved relative to one another in the direction of the optical axis in accordance with a movement of the lens unit, and wherein an aperture diameter of the aperture portion is switched by moving the body structural member between a first position in which the light-blocking members are prevented from opening beyond a predetermined aperture diameter, and a second position in which the light-blocking members are allowed to open beyond the predetermined aperture diameter.

That is to say, by midway preventing or allowing an opening motion of a light-blocking member using an already available body structural member constituting a portion of the lens apparatus, the aperture diameter of the light-blocking member can be switched without utilizing a member dedicated to this purpose as in the related art, so that the lens apparatus and the camera can be prevented from becoming larger and more costly.

It is possible to adopt a configuration in which at least one of the plurality of light-blocking members includes a protrusion that protrudes out of the light-blocking unit when that light-blocking member is opened beyond the predetermined aperture diameter and that when the body structural member is in the first position, the light-blocking members are prevented from opening beyond the predetermined aperture diameter by the body structural member abutting against the protrusion.

It is also possible to adopt a configuration in which the light-blocking unit includes a first light-blocking member having a first protrusion extending in a direction perpendicular to the optical axis, and a second light-blocking member having a second protrusion that is longer than the first protrusion in the direction perpendicular to the optical axis, and that the body structural member includes a first contact portion which extends in the direction of the optical axis and which is abutted by the first protrusion when the body structural member is in the first position, and a second contact portion, which is shorter in the direction of the optical axis than the first contact portion and which can be abutted by the second protrusion when the body structural member is in the second position.

With this configuration, by changing the relative position of the light-blocking unit and the body structural member on the optical axis, it is possible not only to obstruct the opening motion of the light-blocking member by letting the first protrusion abut against the first contact portion or abutting the second protrusion against the second contact portion, but also to allow the motion of the light-blocking member. Thus, it is possible to change the aperture diameter of the aperture portion of the light-blocking member at each of a plurality of zoom positions, for example.

On the other hand, it is also possible to adopt a configuration in which the body structural member includes a first contact portion and a second contact portion, which extend in the direction of the optical axis and which is abutted by different light-blocking members of the plurality of light-blocking members, respectively when the body structural member is in the first position, and the second contact portion is longer in the direction of the optical axis than the first contact portion, and is disposed further away from the optical axis than the first contact portion at a region at the front of the second contact portion.

With this configuration, by changing the relative position of the light-blocking unit and the body structural member on the optical axis, it is possible to let the light-blocking member abut against the first contact portion or against the front region of the second contact portion. And by letting the light-blocking member abut against portions whose distances from the optical axis vary, it is possible to change the aperture diameter of the aperture portion for each of a plurality of zoom positions.

The body structural member may have a substantially cylindrical shape, and, if the tip of the protrusion has a curved surface, then the curvature radius at that tip of the protrusion is smaller than the curvature radius of the body structural member. Thus, point contact is established when the protrusion abuts against the body structural member, and the stop position of the light-blocking member is fixed at a predetermined position, so that the precision of the aperture diameter of the aperture portion can be increased.

Furthermore, by providing a front end portion of the body structural member, with a slanted surface that faces the optical axis, the light-blocking member is guided by that slanted surface towards a closing direction when it is in the open state and collides with the body structural member. Thus, the body structural member does not exert an excessive load on the light-blocking member when the body structural member and the light-blocking member collide.

Furthermore, it is possible that a plurality of reflection suppressing projections that suppress reflection of light toward an image plane side are formed in an inner circumferential surface of the body structural member, and that the reflection suppressing projections that are formed in regions of the inner circumferential surface of the body structural member against which the light-blocking members abut extend in a direction that obliquely intersects with in which the light-blocking members move. Thus, when the light-blocking members are opened and abut against the body structural member, the tips of the light-blocking members will not get caught in the recesses between the reflection suppressing projections, so that the open-close motion of the shutter blades can be carried out smoothly.

Furthermore, a body structural member may be used that guides the light-blocking unit in the direction of the optical axis. Moreover, the above-described lens apparatus of the present invention may be included in a camera.

A camera in accordance with the present invention may include a control circuit that controls the drive of an illumination unit that irradiates illumination light onto an object, and having a first object distance region and a second object distance region at a predetermined zoom position, wherein the lens apparatus can switch the aperture diameter of the aperture portion in a first object distance region to the smaller aperture diameter in a second object distance region by changing a relative position between the light-blocking unit and the body structural member, and wherein the control circuit lets the illumination unit irradiate the illumination light when an image is taken at the second object distance region.

Thus, when performing image-taking on a close range side (second focus object distance region) in a wide-angle state, the aperture diameter of the aperture portion can be made small, and by emitting light from the illumination unit, photographic imaging with little fuzziness and camera shake becomes possible.

These and further objects and features of the invention will become apparent from the following detailed description of preferred embodiments thereof taken in conjunction with the accompanying drawings.

BRIEF DESCRIPTION OF THE DRAWINGS

FIG. 40 is a schematic view of the shutter device and the second rectilinear motion tube of Embodiment 4 in the wide close range state when the shutter blades are in the open state.

DETAILED DESCRIPTION OF THE PREFERRED EMBODIMENTS

Hereinafter, preferred embodiments of the invention will be described in detail with reference to the drawings.
Embodiment 1

Referring to FIGS. 1 to 30, the following is an explanation of a lens barrel according to Embodiment 1 of the present invention.

First, the shutter device provided inside the lens barrel is explained.

Figure 1:
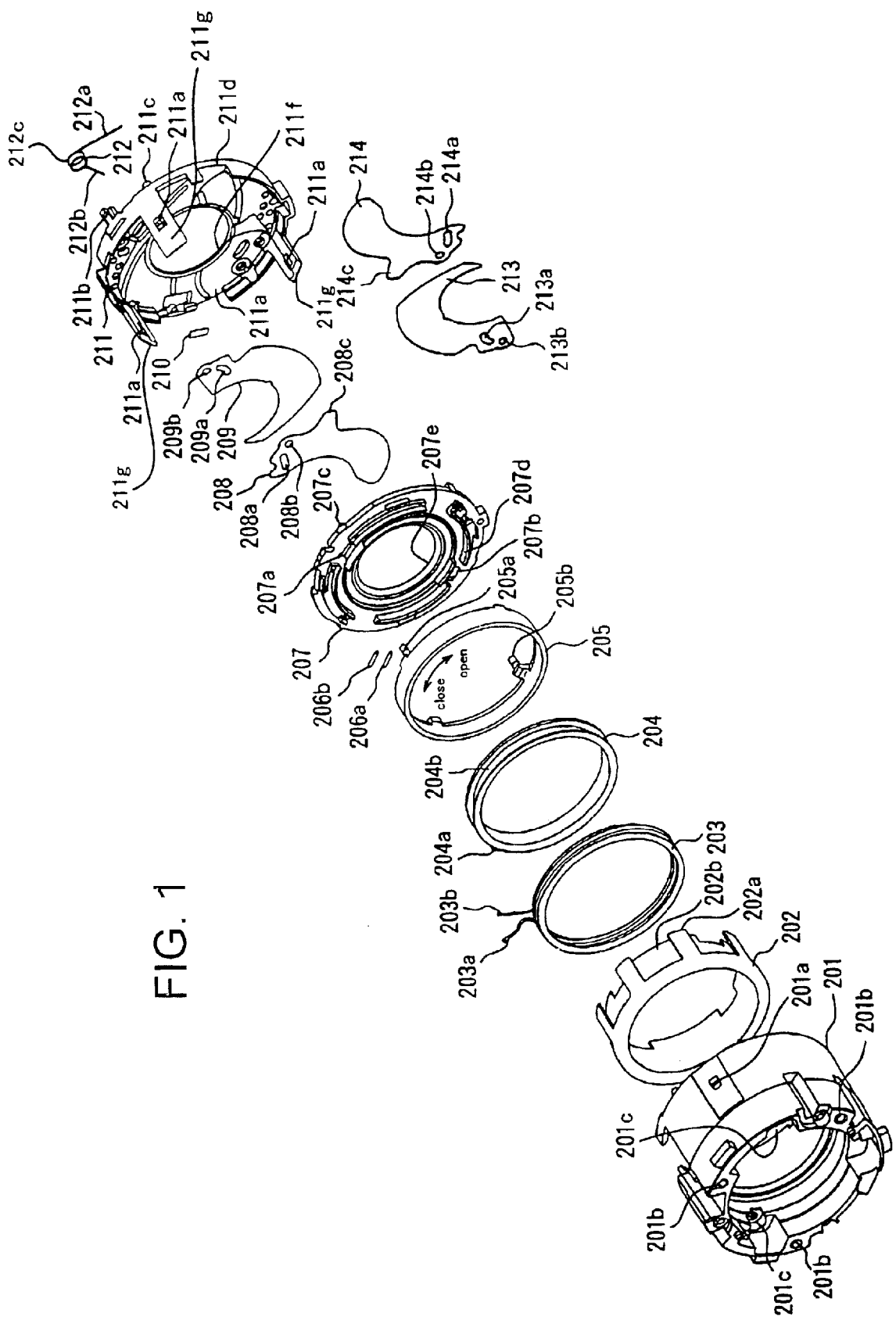
FIG. 1 is an exploded perspective view of a shutter device.

FIG. 1 is an exploded perspective view of a shutter device according to this embodiment. This shutter device drives four shutter blades (light-blocking members) 208, 209, 213 and 214 by rotating a shutter rotor 205 back and forth over 10° around the optical axis, thereby opening and closing a light passage.

The following is an explanation of the structure of the shutter device. The shutter rotor 205 is made of a ring-shaped plastic magnet, and is magnetized such that south poles and north poles alternate in circumferential direction, to a total of sixteen poles. A shutter yoke 202 is made of a magnetic material, such as steel, and includes an outer yoke 202a, provided with protrusions at eight locations, and a cylindrically shaped inner yoke 202b.

Shutter terminal pins 206a and 206b are fastened to a saddle portion 204a of a shutter bobbin 204. A shutter coil 203 is wound around a concave portion 204b formed in the outer circumference of the shutter bobbin 204. One end 203a of the shutter coil 203 is wound around and soldered to the shutter terminal pin 206a, and the other end 203b of the shutter coil 203 is wound around and soldered to the shutter terminal pin 206b.

The shutter coil unit into which the shutter bobbin 204, the shutter coil 203, and the shutter terminal pins 206a and 206b are assembled is inserted into a groove that is formed between the inner yoke 202b and the outer yoke 202a in the shutter yoke 202. Also the shutter rotor 205 is inserted into the shutter yoke 202.

A second shutter base 207 is arranged like a, lid on the shutter yoke 202. The second shutter base 207 is fixed to the shutter yoke 202 by pressing flange portions 207b into the outer yoke 202a.

Here, drive shafts 205a and 205b of the shutter rotor 205 respectively pass through angular holes 207a and 207b in the second shutter base 207, and protrude in rearward direction in FIG. 1.

A hole 208b in the first shutter blade 208 mates with a shaft 207c of the second shutter base 207, and a long hole 208a in the first shutter blade 208 engages the drive shaft 205a of the shutter rotor 205. A hole 209b in the second shutter blade 209 mates with a shaft (not shown in the drawings; has the same shape as the shaft 207c) of the second shutter base 207, and a long hole 209a in the second shutter blade 209 engages the drive shaft 205a of the shutter rotor 205.

Here, the first shutter blade 208 and the second shutter blade 209 are rotated around those shafts (207c), by the engaging action of the drive shaft 205a and the long holes 208a and 209a when rotating the shutter rotor 205.

A hole 213b of the third shutter blade 213 mates with a shaft (not shown in the drawings; has the same shape as the shaft 207c) of the second shutter base 207, and a long hole 213a in the third shutter blade 213 engages the drive shaft 205b of the shutter rotor 205. A hole 214b of the fourth shutter blade 214 mates with a shaft (not shown in the drawings; has the same shape as the shaft 207c) of the second shutter base 207, and a long hole 214a in the fourth shutter blade 214 engages the drive shaft 205b of the shutter rotor 205.

Here, the third shutter blade 213 and the fourth shutter blade 214 are rotated around those shafts, by the engaging action of the drive shaft 205b and the long holes 213a and 214a when rotating the shutter rotor 205.

A first shutter base 201 is attached from the front to the second shutter base 207, to which the shutter blades 208, 209, 213 and 214 and the shutter coil unit are attached, and a shutter plate 211 is attached from the rear to the second shutter base 207.

The shutter plate 211 is provided at three circumferential locations with arm portions 211g extending in the direction of the optical axis, and protrusions 201a formed at three circumferential locations on the first shutter base 201 are engaged with angular holes 211a formed in these arm portions 211g.

A coil portion 212c of a shutter spring 212 is fitted onto a spring peg 211b of the shutter plate 211, and one end 212a of the shutter spring 212 engages a boss 211c in the shutter plate 211, whereas the other end 212b abuts against the drive shaft 205a of the shutter rotor 205. Thus, the shutter spring 212 urges the drive shaft 205a with that other end 212b in counterclockwise direction ("close") in FIG. 1. In this situation, the shutter blades 208, 209, 213 and 214 occlude the light passage (aperture portion 207e in second shutter base 207 and aperture portion 211f in shutter plate 211).

The following is an explanation of the open-close motion of the shutter blades 208, 209, 213 and 214 in the shutter device with the above-described structure.

When no current flows through the shutter coil 203, the shutter rotor 205 is rotated counterclockwise in FIG. 1 due to the spring force of the shutter spring 212, and is stopped in a position in which the drive shaft 205a abuts against the wall at the left edge of the angular hole 207a of the second shutter base 207. In this situation, the four shutter blades 208, 209, 213 and 214 occlude the aperture portion 207e in the second shutter base 207, and the shutter is in a closed state (see FIG. 17).

When a dc current flows through the shutter coil 203, a torque in clockwise direction ("open") in FIG. 1 acts on the shutter rotor 205 due to the magnetic action of the shutter rotor 205, which has been magnetized to 16 poles, and the outer yoke 202a of the shutter yoke 202. This torque rotates the shutter rotor 205 for 10° in clockwise direction against the spring force of the shutter spring 212, stopping in a position in which the drive shaft 205a abuts against the wall at the right edge of the angular hole 207a of the second shutter base 207.

Figure 19:
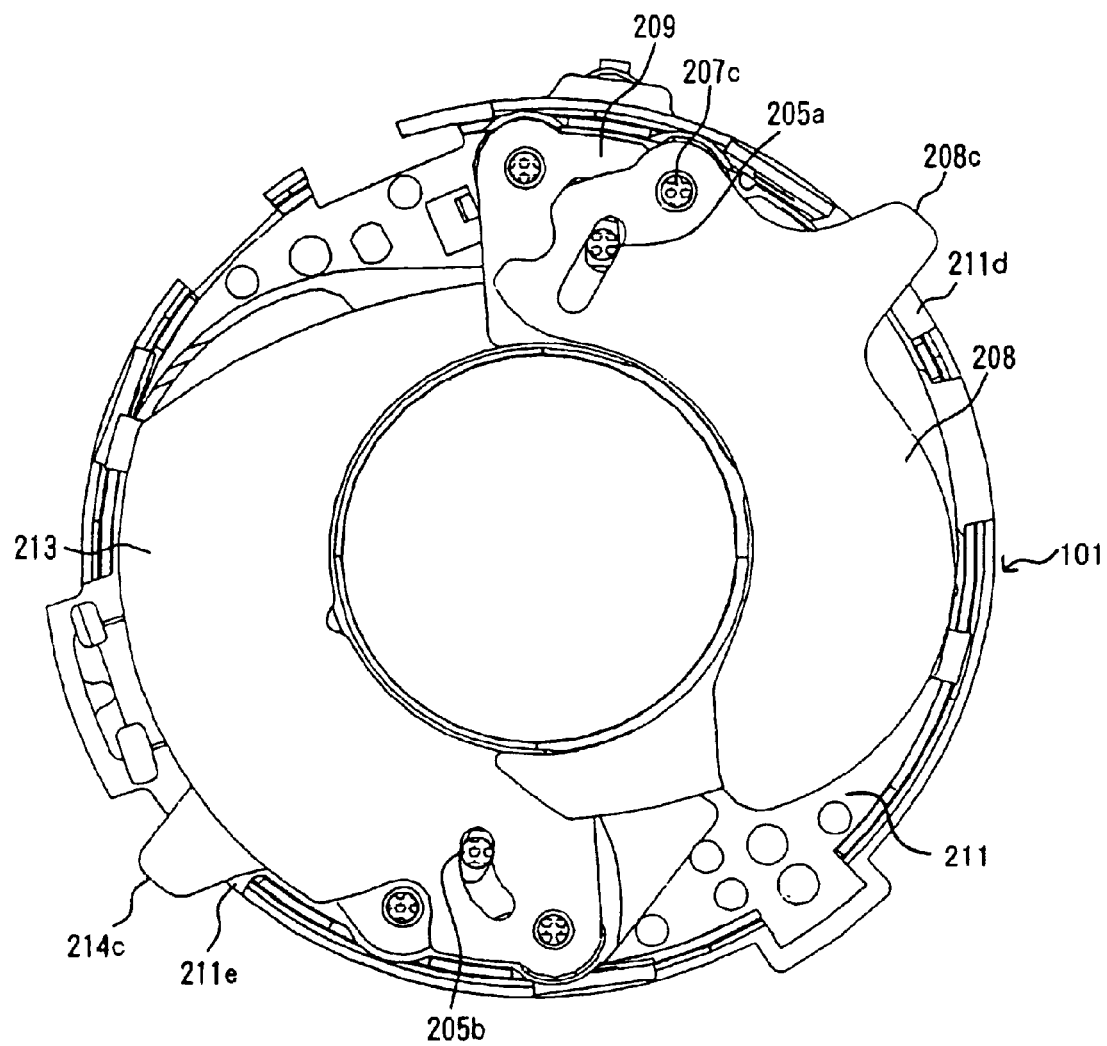
FIG. 19 is a diagram illustrating the arrangement of the shutter blades in the telephoto state when the shutter blades are in the open state.

In this situation, the four shutter blades are moved outward in radial direction from the aperture portion 207e of the second shutter base 207, and the shutter blades are in an open state (FIG. 19). Here, when the shutter blades are in the open state (FIG. 19), an abutting protrusion (nose portion) 208c of the first shutter blade 208 juts out in radial direction from a cut-out 211d in the shutter plate 211.

Figure 17:
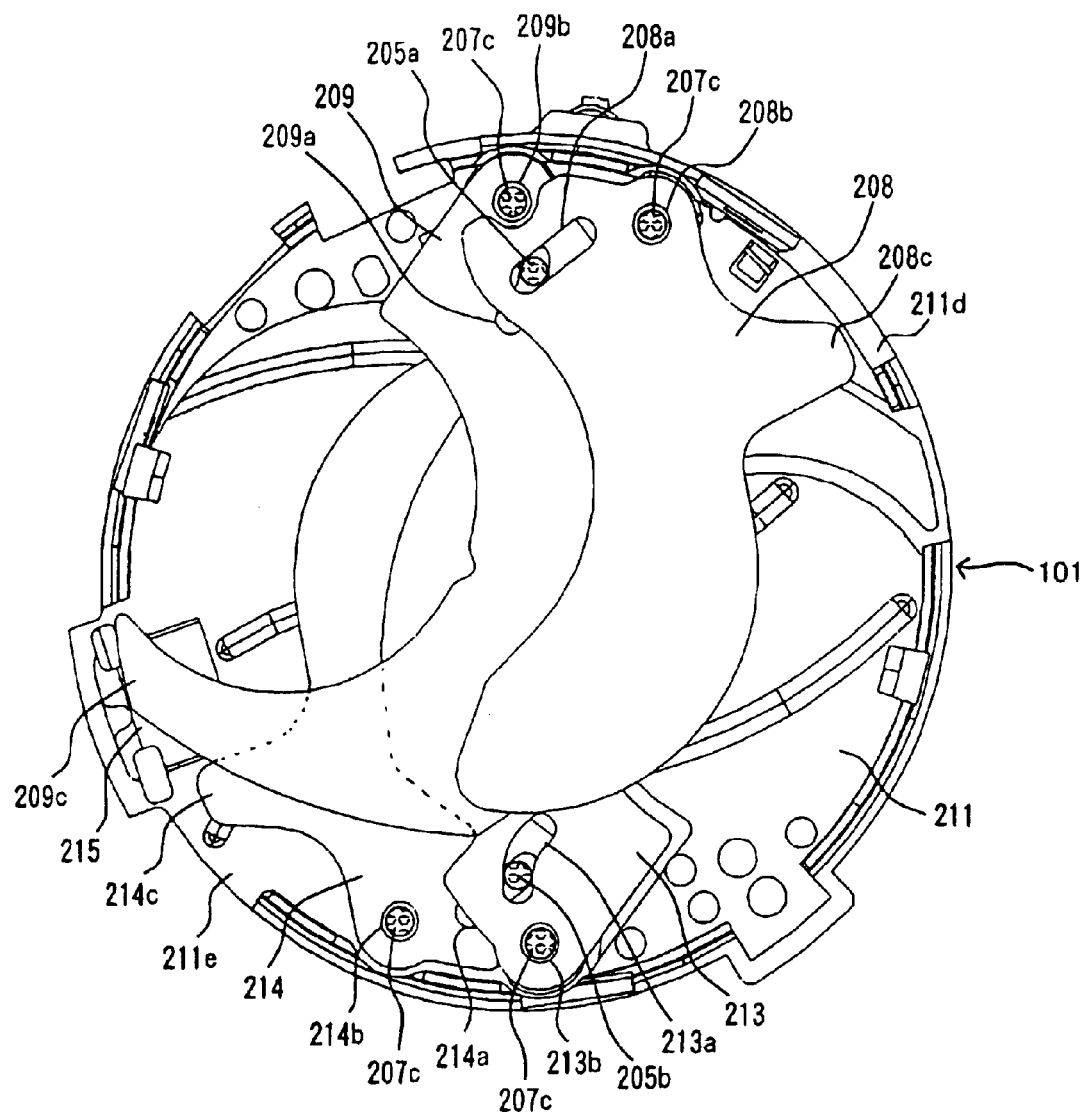
FIG. 17 is a diagram illustrating the arrangement of the shutter blades in the telephoto state when the shutter blades are in the closed state.

When the current through the shutter coil 203 is stopped, the shutter rotor 205 is rotated due to the spring force of the shutter spring 212, and the shutter blades are returned to their closed state (FIG. 17).

In order to control the light amount that passes through the aperture portion 207e of the second shutter base 207 to a small light amount, it is possible to let a current flow through the shutter coil 203 in the initial state in which the shutter blades are closed, halt the current through the shutter coil 203 before the shutter blades are completely open, and close the shutter blades through the spring force of the shutter spring 212. Furthermore, it is possible to let a current flow in the opposite direction through the shutter coil 203 before the shutter blades are completely open, and to close the shutter blades through the spring force of the shutter spring 212 and the magnetic action of the shutter rotor 205 and the shutter yoke 202.

With this control, image-taking with small aperture diameters and high shutter speeds becomes possible.

On the other hand, under such image-taking conditions as when the object is dark, in order to control the light amount that passes through the aperture portion 207e to a large light amount, it is possible to rotate the shutter rotor 205 for 10° in clockwise direction in FIG. 1 by first letting a current flow through the shutter coil 203 in the initial state in which the shutter blades are closed, and to halt the shutter rotor 205 in a position in which the drive shaft 205a abuts against the wall at the right edge of the angular hole 207a in the second shutter base 207.

Keeping up the current through the shutter coil 203 in this situation, the aperture diameter through which light passes is maintained at the size of the aperture portion 207e. Then, by stopping the current through the shutter coil 203 at the point in time when the light amount necessary for exposure has passed through the aperture portion 207e, the shutter rotor 205 is rotated in counterclockwise direction in FIG. 1 through the spring force of the shutter spring 212, and the shutter blades are closed again (FIG. 17).

Figure 2:
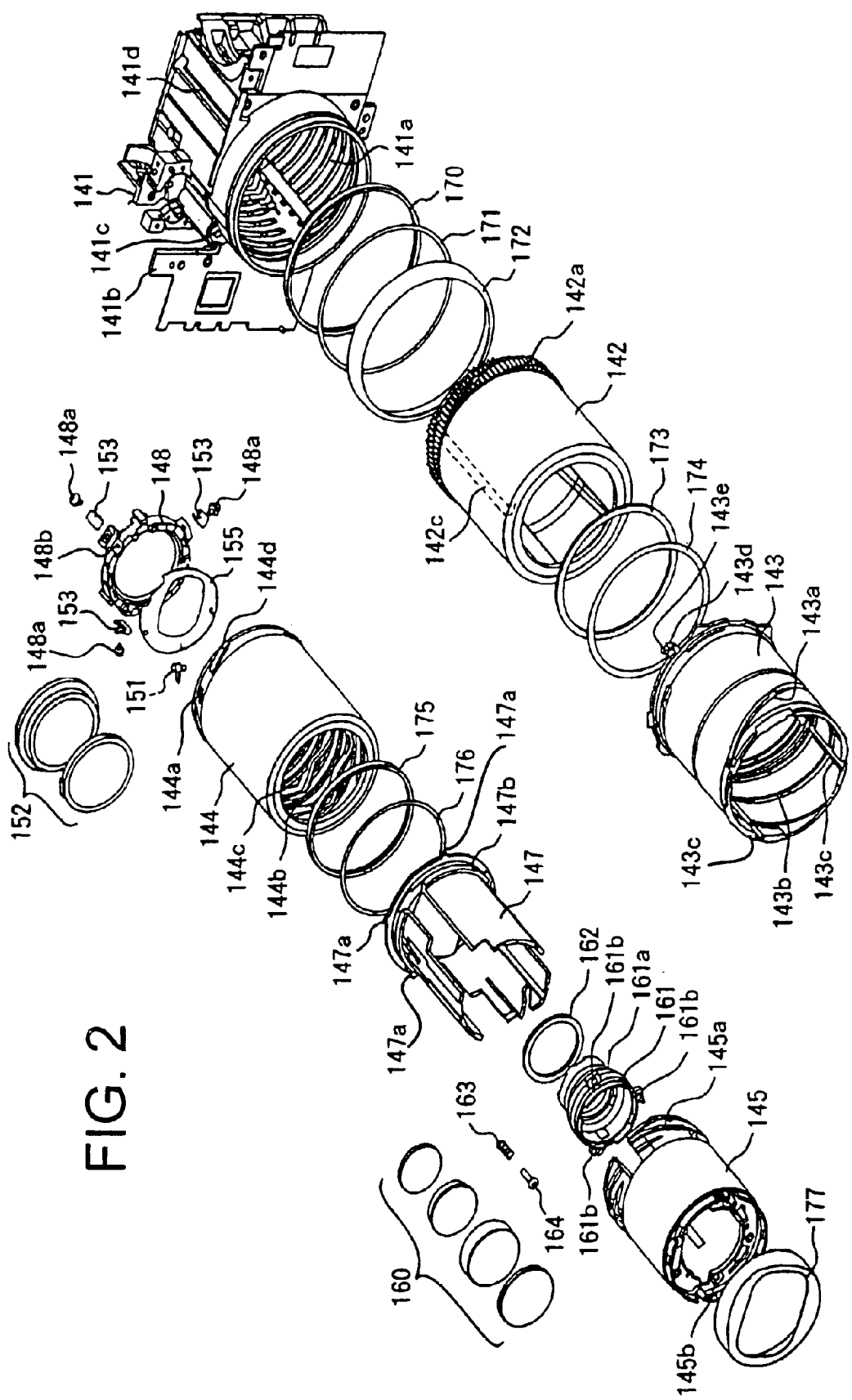
FIG. 2 is an exploded perspective view of a lens barrel incorporated in by the shutter device.
Figure 3:
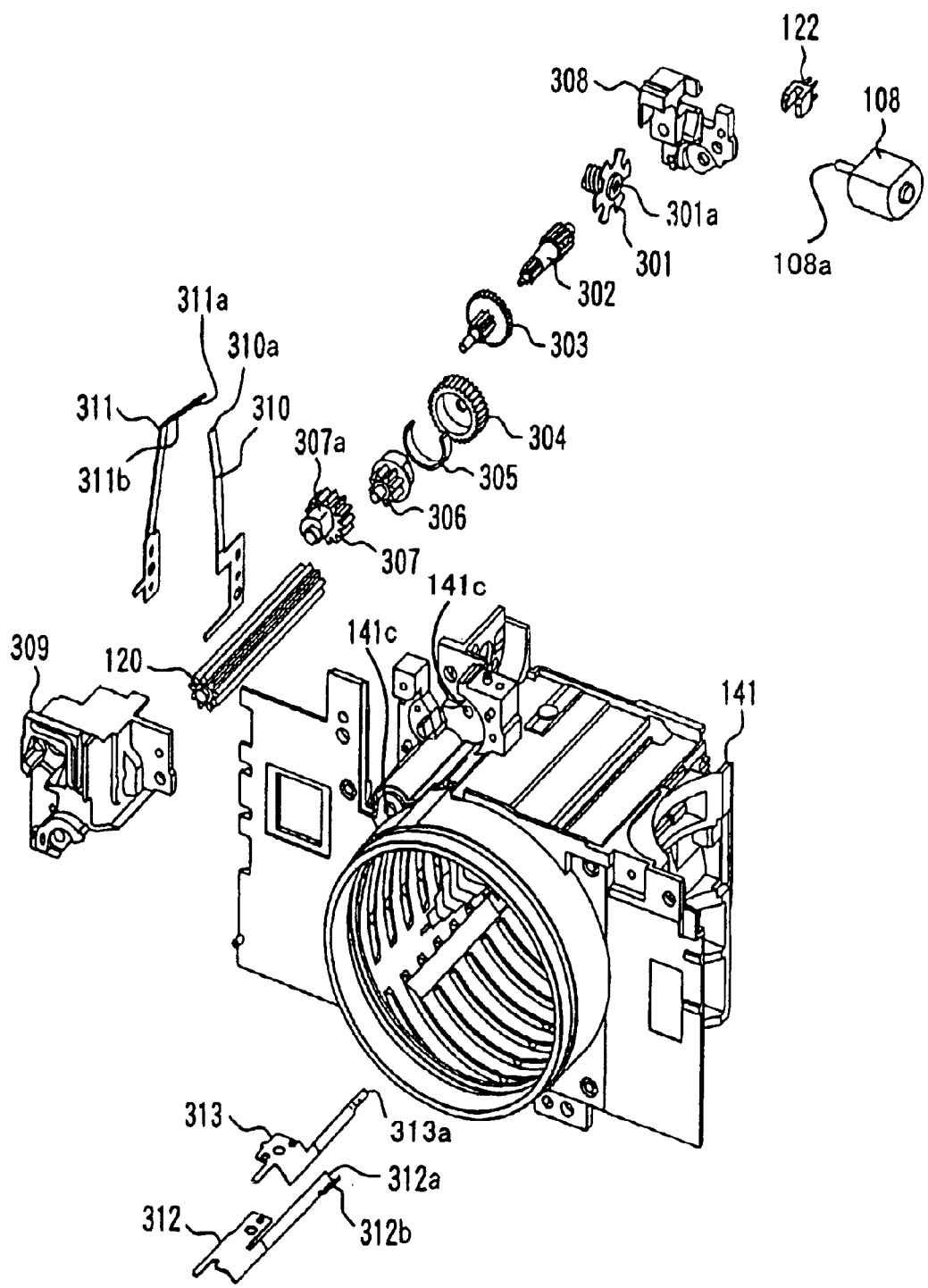
FIG. 3 is an exploded perspective view of a power transmission mechanism in the lens barrel.

Referring to FIGS. 2 and 3, the following is an explanation of the structure of the lens barrel according to this embodiment. The lens barrel according to this embodiment is a 3-stage collapsible (telescoping type) lens barrel including two so-called "differential tubes."

Figure 4:
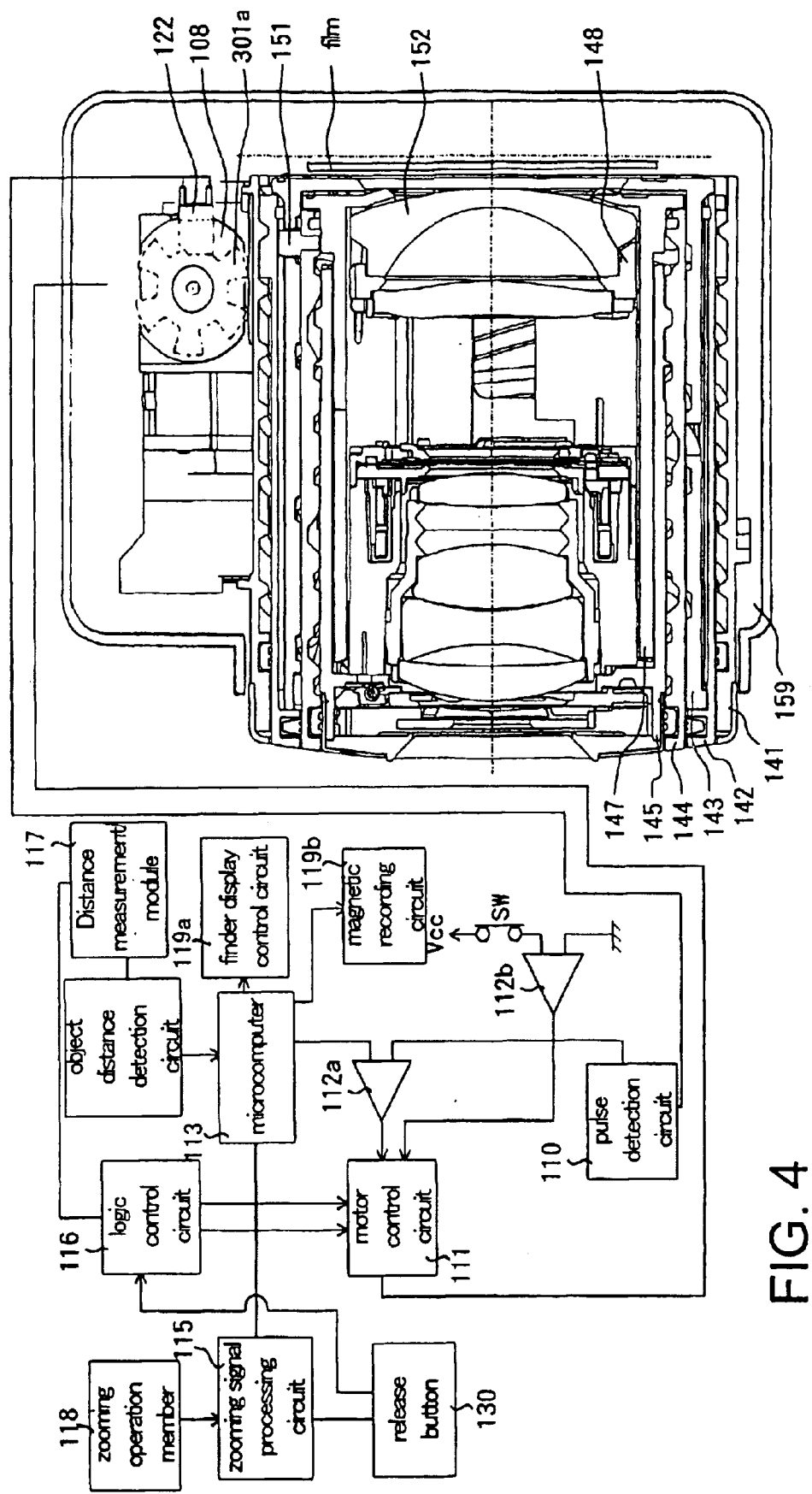
FIG. 4 is a cross-sectional view of the barrel in the collapsed state and a block diagram of the barrel drive controls.

Numeral reference 141 denotes a fixed tube, which is fixed via a flange portion 141b to a camera body 159 (FIG. 4). Female helicoids 141a are formed in an inner circumferential surface of this fixed tube 141. A fixed light-blocking rubber 170, a fixed light-blocking sheet 171 and a fixed cover 172 are arranged in front of the fixed tube 141.

Numeral reference 142 denotes a first differential tube. A male helocoid, which engages the female helicoids 141a, and a gear meshing with a long face pinion 120 are formed overlappingly on the outer circumference 142a at the rear end of the first differential tube 142. The first differential tube 142 can be advanced and retracted in the direction of the optical axis while being rotated around the optical axis by the engaging action of the female helicoids 141a and the male helicoids. A first light-blocking rubber 173 and a first light-blocking sheet 174 are arranged in front of the first differential tube 142.

Numeral reference 143 denotes a first rectilinear motion tube that is arranged inward from the first differential tube 142, and that can slide with respect to a rotation around the optical axis of the first differential tube 142. A pin portion 143e formed on a saddle portion 143d of the first rectilinear motion tube 143 engages a rectilinear motion groove 141d of the fixed tube 141.

A zoom gear unit that rotates the first differential tube 142 is fixed to and supported by the fixed tube 141, as shown in FIG. 3. Of the gears of the zoom gear unit, the long face pinion 120 is supported rotatively by the fixed tube 141 by fitting its two end portions through holes 141c in the fixed tube 141.

A first gear 301 is press-fitted to a rotation shaft 108a of a motor 108, and this first gear 301 meshes with a second gear 302. The second gear 302 meshes with a third gear 303, which in turn meshes with a fourth gear 304.

A slipper spring 305 is arranged between the fourth gear 304 and a fifth gear 306, and the fourth gear 304 and the fifth gear 306 can be rotated unitarily through the friction force due to deformation of the slipper spring 205. Here, when a torque is applied to the fourth gear 304 or the fifth gear 306 that exceeds the friction force of the slipper spring 305, then the fourth gear 304 and the fifth gear 306 slip against one another, and the transmission of an excessive force to the motor 108 can be prevented.

The fifth gear 306 meshes with a sixth gear 307, and this sixth gear 307 meshes with the long face pinion 120.

A tip portion 310a of a first zoom-stage switch 310 is ordinarily in contact with an intermediate portion 311b of a second zoom-stage switch 311, so that their electrical connection is in an ON state. When the sixth gear 307 is rotated through the drive force of the motor 108, a solid cam portion 307a pushes a contact portion 311a of the second zoom-stage switch 311 upward, so that the contact between the front end portion 310a and the intermediate portion 311b is lost, and their electrical connection assumes an OFF state. This switching of the electrical connection from ON to OFF is performed for each focal length when zooming, thereby transmitting focal length information to the camera body when zooming.

A first zoom base 308 and a second zoom base 309 are arranged at the two ends of the gear train made up of the first gear 301 to the sixth gear 307, and the gear train is fixed to the fixed tube 141 by screwing these zoom bases 308 and 309 to the fixed tube 141.

A first collapsed-end switch 312 and a second collapsed-end switch 313 are fixed at the bottom of the fixed tube 141, and when the lens barrel has been thrust out in the direction of the optical axis to the image-taking position, a tip portion 312a and a tip portion 313a come in contact, thus assuming an electrical ON state. On the other hand, when the lens barrel is pulled back in the direction of the optical axis from the image-taking position and assumes a non-image-taking position, then the rear end of the first rectilinear motion tube 143 pushes down the protrusion 312a of the first collapsed-end switch 312, so that the tip portion 312a and the tip portion 313a are not in contact anymore, thus assuming an electrical OFF state.

The ON/OFF signals from the first collapsed-end switch 312 and the second collapsed-end switch 313 are output to the camera body, which decides whether the lens barrel is in an image-taking position or in a non-image-taking position.

When a drive force is transmitted from the motor 108 to the long face pinion 120, the first differential tube 142, which is in a gear engagement with the long face pinion 120, rotates around the optical axis, in accordance with the rotation of the long face pinion 120. Here, since the outer circumferential rear portion (male helicoids) 142a of the first differential tube 142 is engaged with the female helicoids 141a of the fixed tube 141, the first differential tube 142 is advanced or retracted in the direction of the optical axis while rotating around the optical axis.

The pin portion 143e at the first rectilinear motion tube 143 engages the rectilinear motion groove 141d of the fixed tube 141, and the first rectilinear motion tube 143 can slide with respect to a rotation of the first differential tube 142, so that it is advanced/retracted only in the direction of the optical axis, and affected only by the advancing/retracting motion of the first differential tube 142 in the direction of the optical axis.

Numeral reference 144 denotes a second differential tube, which is incorporated inward from the first rectilinear motion tube 143. A plurality of male helicoids 144d formed in an outer circumferential surface of the second differential tube 144 engage a plurality of second cam grooves 143a formed in the first rectilinear motion tube 143. A second light-blocking rubber 175 and a second light-blocking sheet 176 are arranged in front of the second differential tube 144.

A drive pin 151, which is fixed to a hole 144a formed on the outer circumference of the second differential tube 144 passes through a first cam groove 143b formed in the first rectilinear motion tube 143, and engages a rectilinear motion groove 142c formed in the inner circumferential surface of the first differential tube 142. A second rectilinear motion tube (body structural member) 147 is incorporated inward from the second differential tube 144, and this second rectilinear motion tube 147 can slide with respect to a rotation of the second differential tube 144 around the optical axis.

A plurality of key portions 147a are formed in circumferential direction on a flange portion 147b of the second rectilinear motion tube 147, and these key portions 147a engage a plurality of rectilinear motion grooves 143c formed on the inner circumferential surface of the first rectilinear motion tube 143.

In this configuration, when the first differential tube 142 is rotated around the optical axis, the engaging action of the drive pin 151 and the rectilinear motion groove 142c as well as the engaging action of the male helicoids 144d of the second rectilinear motion tube 144 and the second cam groove 143a of the first rectilinear motion tube 143 advance and retract the second differential tube 144 while rotating it around the optical axis. Here, the second rectilinear tube 147 can slide with respect to a rotation of the second differential tube 144, so that it is only advanced and retracted in the direction of the optical axis.

A group 1 helicoid 145a, which is formed on the outer circumference of a group 1 lens barrel 145 is engaged with second cam grooves 144b formed in the inner circumferential surface of the second differential tube 144. Furthermore, three group 2 cam pins 148a provided on the outer circumference of a group 2 lens holder 148 holding a second lens group 152 are engaged with third cam grooves 144c formed in the inner circumferential surface of the second differential tube 144.

When the second differential tube 144 is rotated around the optical axis, the group 1 lens barrel 145 is advanced or retracted in the direction of the optical axis due to the engaging action of the group 1 helicoid 145a and the group 2 cam grooves 144b, and can be moved to a predetermined position in accordance with the drive amount of the motor 108. Moreover, the group 2 lens holder 148 is advanced or retracted in the direction of the optical axis due to the engaging action of the group 2 cam pins 148a and the third cam grooves 144c, and can be moved to a predetermined position in accordance with the drive amount of the motor 108. A group 2 mask 155 is arranged in front of the group 2 lens holder 148.

Here, a group 2 spring 153 engages an angular hole 148b in the group 2 lens holder 148, and urges the group 2 cam pins 148a outward in radial direction with respect to the group 2 lens holder 148. This eliminates play between the third cam grooves 144c and the group 2 cam pins 148a.

The following is an explanation of the parts arranged around the shutter device.

In FIG. 2, a first lens group 160 including four lenses is arranged inside a group 1 lens holder 161, and a sponge 162 is disposed on an outer circumferential portion 161a of the group 1 lens holder 161. The group 1 lens holder 161 is disposed and fixed inside the first shutter base 201 shown in FIG. 1. That is to say, a group 1 adjustment spring 163 is inserted between a recess 201c of the first shutter base 201 and an arm portion 161b formed in the outer circumference of the group 1 lens holder 161, and the group 1 lens holder 161 is fixed to the first shutter base 201 by screwing a group 1 adjustment screw 164 for a predetermined screwing amount into the arm portion 161b and the recess 201c.

The shutter device including the first shutter base 201 holding the group 1 lens holder 161 is fastened by inserting it into the group 1 lens barrel 145 from the rear side in FIG. 2. That is to say, the shutter device is fastened to the group 1 lens barrel 145 by passing a screw (not shown in the drawings) through a hole 145b of the group 1 lens barrel 145, and screwing it to a threaded portion 201b in the first shutter base 201. A group 1 cover 177 is fastened in front of the group 1 lens barrel 145.

The following is an explanation of the structure and operation of a camera provided with a lens barrel of the above-described structure.

Figure 8:
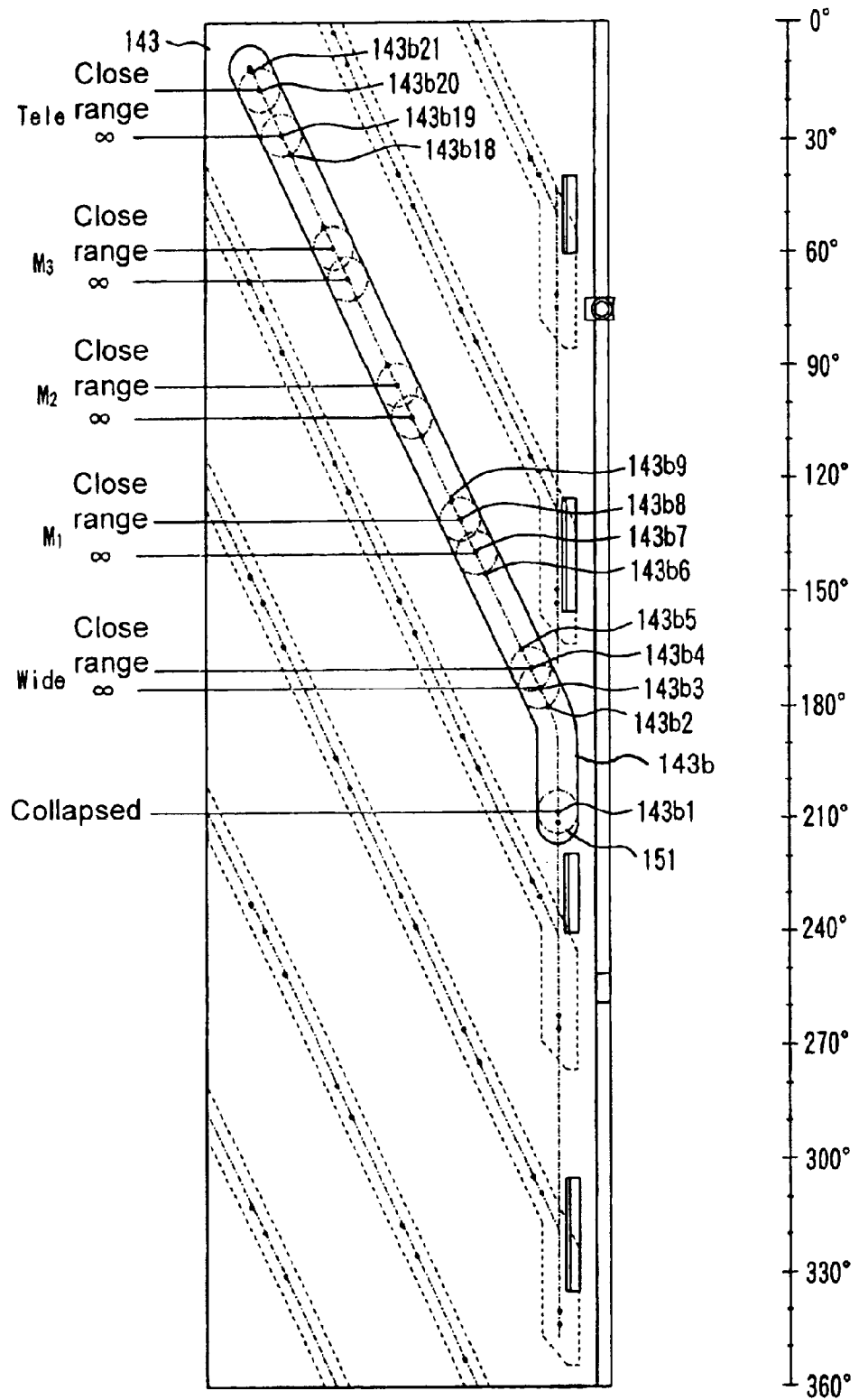
FIG. 8 is a development diagram of the first rectilinear motion tube.
Figure 9:
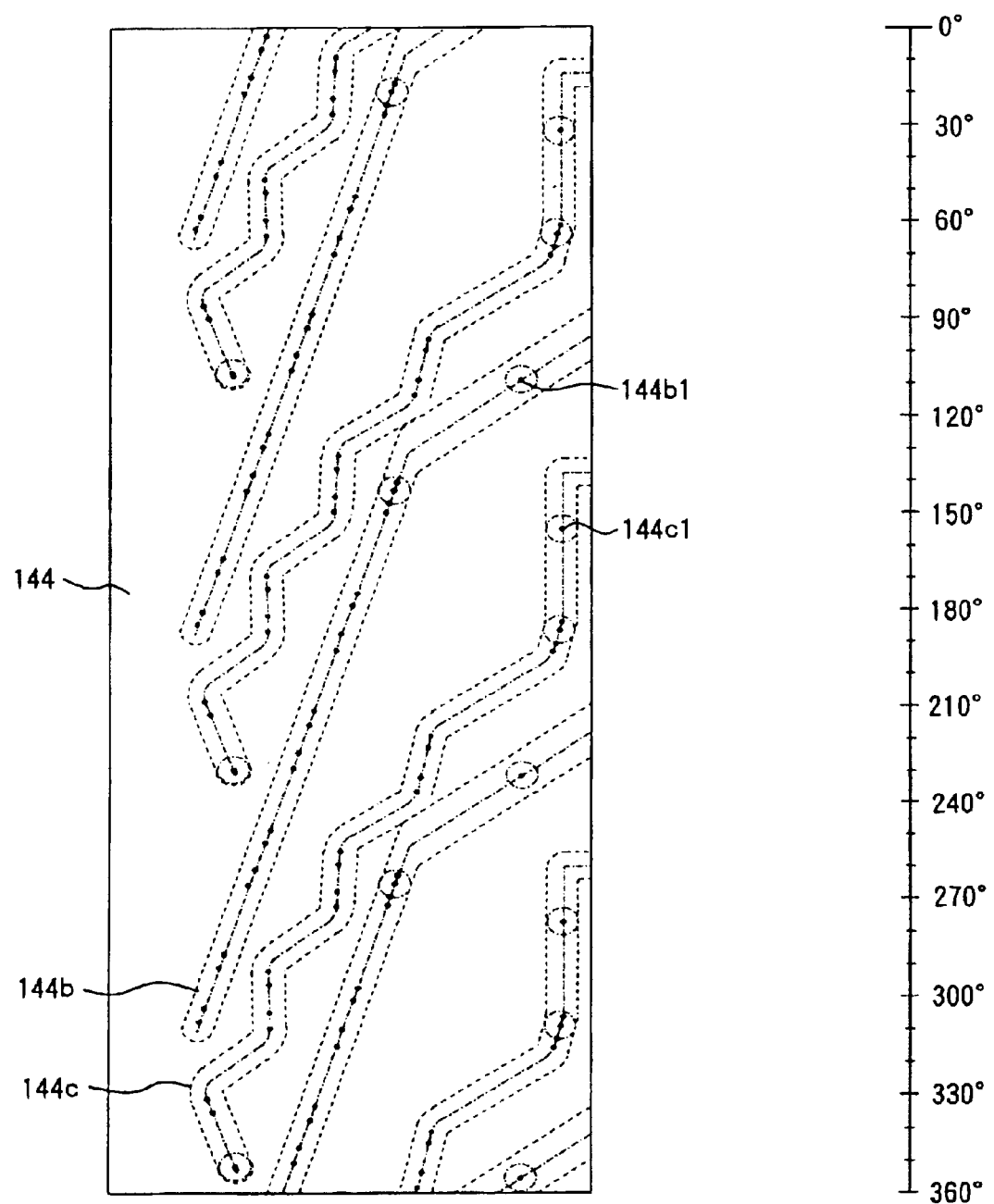
FIG. 9 is a development diagram of the second differential motion tube.

When the lens barrel is in the collapsed state shown in FIG. 4, the first differential tube 142, which is helicoidally coupled to the fixed tube 141, does not protrude beyond the front face of the fixed tube 141. In this situation, the drive pin 151 of the second differential tube 144 is In the position marked as 143b1 in the first cam groove 143b of the first rectilinear motion tube 143, as shown in FIG. 8.

Figure 10:
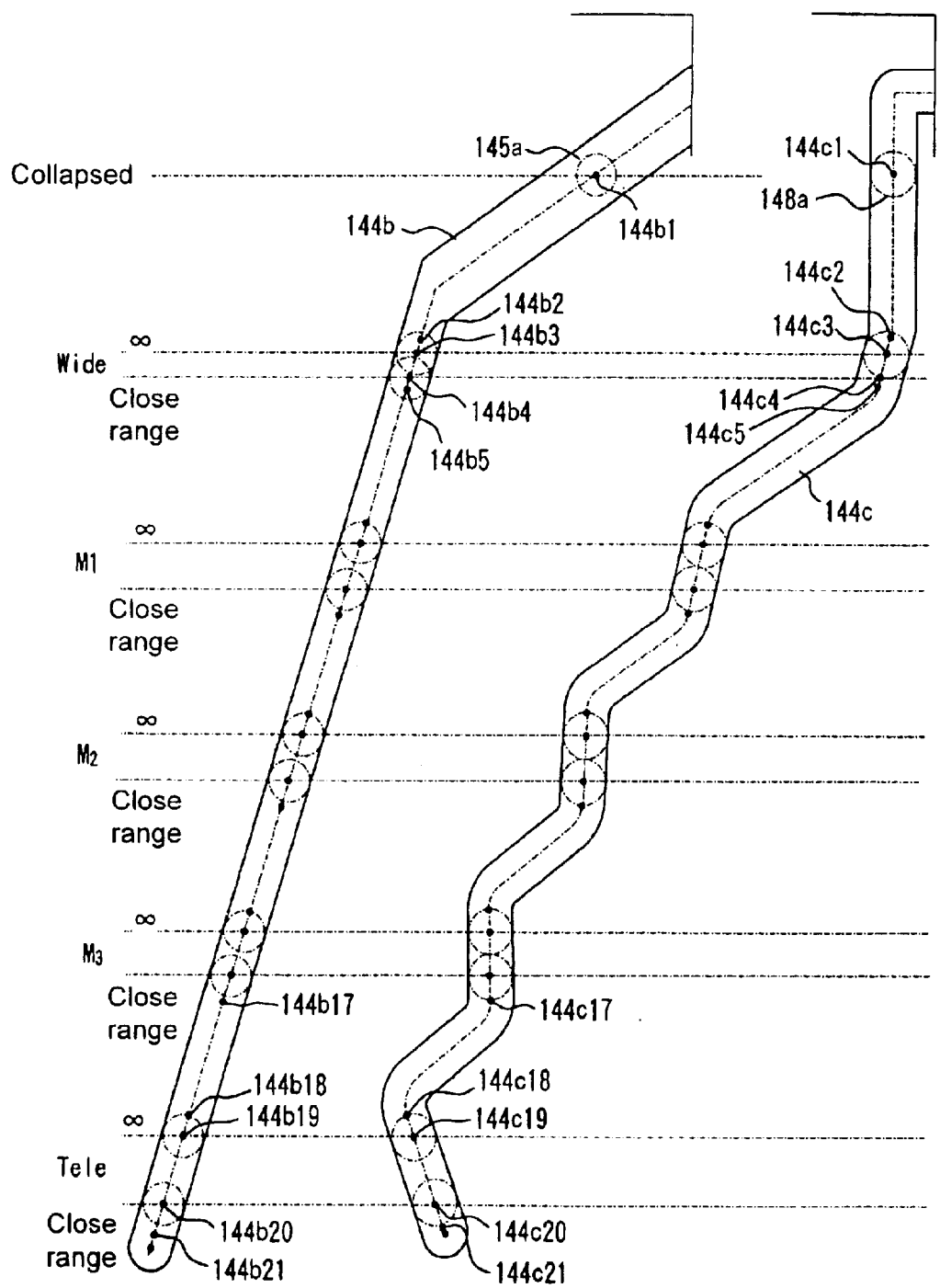
FIG. 10 is a diagram illustrating the cam trajectories in the second differential tube.

The group 1 helicoid 145a that is formed on the outer circumference of the group 1 lens barrel 145 holding the first lens group 160 is in the position marked as 144b1 in the second cam groove 144b in the second differential tube 144 shown in FIG. 10, and the group 1 lens barrel 145 does not protrude the second differential tube 144.

Furthermore, the three group 2 cam pins 148a provided on the outer circumference of the group 2 lens holder 148 holding the second lens group 152 are in the position marked as 144c1 in the third cam grooves 144c of the second differential tube 144.

Thus, when the lens barrel is in its collapsed state, the group 1 lens barrel 145 does not protrude from the fixed tube 141.

As described above, a male helicoid and a gear are formed overlappingly on the outer circumferential rear portion 142a of the first differential tube 142, and the gear meshes with the long face pinion 120. The long face pinion 120 is linked to the motor 108 via the gear train from the sixth gear 307 to the first gear 301.

In FIG. 4, numeral reference 301a denotes a pulse plate having a 6-blade propeller, numeral reference 122 denotes a PI (photo-interrupter) for detecting the passage of the propeller of the pulse plate 301a, and numeral reference 110 denotes a pulse detection circuit detecting the output of the PI 122. Numeral reference 111 denotes a motor control circuit, constituting a motor forward rotation drive circuit in accordance with the output of the comparator 112a and a motor reverse rotation drive circuit in accordance with the output of the comparator 112b.

Numeral reference 130 denotes a release button provided with a two-step stroke structure, which outputs a first stroke or a second stroke status signal to a zooming signal processing circuit 115 in response to its operation by the camera operator.

Numeral reference 113 denotes a microcomputer (control circuit), which calculates a rotation amount of the first differential tube 142, as shown in Table 1 below, from the output signals that are output from an object distance detection circuit 114 and the zooming signal processing circuit 115. In the camera of this embodiment, switching between the following focal lengths is possible: wide (35 mm), M (middle) 1 (50 mm), M2 (70 mm), M3 (105 mm), and telephoto (150 mm).

TABLE 1

| lens focal length | | condition | signal output by the zooming signal processing circuit 115 signal | signal output by the object distance detecting circuit 114 object distance | signal | signal input into comp. 112a |
|---|---|---|---|---|---|---|
| Wide | actual focal length | zoom direction W=>T | 10 | 8 m | 0 | 10 |
| | | zoom direction T=>W | 10 | 4 m | 1 | 11 |
| | | — | — | — | — | — |
| | 35 mm | release button at first stroke | 10 | 0.6 m | 9 | 19 |
| M1 | actual focal length | zoom direction W=>T | 20 | 8 m | 0 | 20 |
| | | zoom direction T=>W | 20 | 4 m | 1 | — |
| | | — | — | — | — | — |
| | 50 mm | release button at first stroke | 20 | 0.6 m | 9 | 29 |
| M2 | actual focal length | zoom direction W=>T | 30 | 8 m | 0 | 30 |
| | | zoom direction T=>W | 30 | 4 m | 1 | — |
| | | — | — | — | — | — |
| | 70 mm | release button at first stroke | 30 | 0.6 m | 9 | 39 |
| M3 | actual focal length | zoom direction W=>T | 40 | 8 m | 0 | 40 |
| | | zoom direction T=>W | 40 | 4 m | 1 | — |
| | | — | — | — | — | — |
| | 105 mm | release button at first stroke | 40 | 0.6 m | 9 | 49 |
| Tele | actual focal length | zoom direction W=>T | 50 | 8 m | 0 | 50 |
| | | zoom direction T=>W | 50 | 4 m | 1 | — |
| | | — | — | — | — | — |
| | 150 mm | release button at first stroke | 50 | 0.6 m | 9 | 59 |

Numeral reference 116 is a logic control circuit, which puts the motor forward rotation drive circuit of the motor control circuit 111 into an operation preparation state when the camera operator pushes the release button 130 down to the first stroke. On the other hand, when the camera operator stops the operation of the release button 130, the logic control circuit 116 puts the motor reverse rotation drive circuit of the motor control circuit 111 into an operation preparation state.

When the camera operator pushes the release button 130 down to the first stroke and turns on a power switch, the logic control circuit 116 outputs a start-up signal to a distance measurement module 117, and outputs a motor start-up signal to the motor control circuit 111 after a sufficient time has passed before terminating the distance measurement with the distance measurement module 117.

The object distance detection circuit 114 converts the object distance information obtained with the distance measurement module 117 into a digital signal, and outputs to the microcomputer 113.

Numeral reference 118 denotes a zooming operation member, which is operated by the camera operator in order to change the focal length over the range of 35 mm to 150 mm. The zooming signal processing circuit 115 detects the time that the zooming operation member 118 has been operated, converts the detection result into one of the numbers 0 to 50 as shown in Table 1, and outputs that number to the microcomputer 113.

Numeral reference 119a denotes a finder display control circuit, which displays predetermined information in a finder display portion (not shown in the drawings) that is provided in the camera body, based on control signals from the microcomputer 113. Numeral reference 119b denotes a magnetic recording circuit, which records predetermined image-taking information on a magnetic recording portion of the photographic film, based on control signals from the microcomputer 113.

Figure 5:
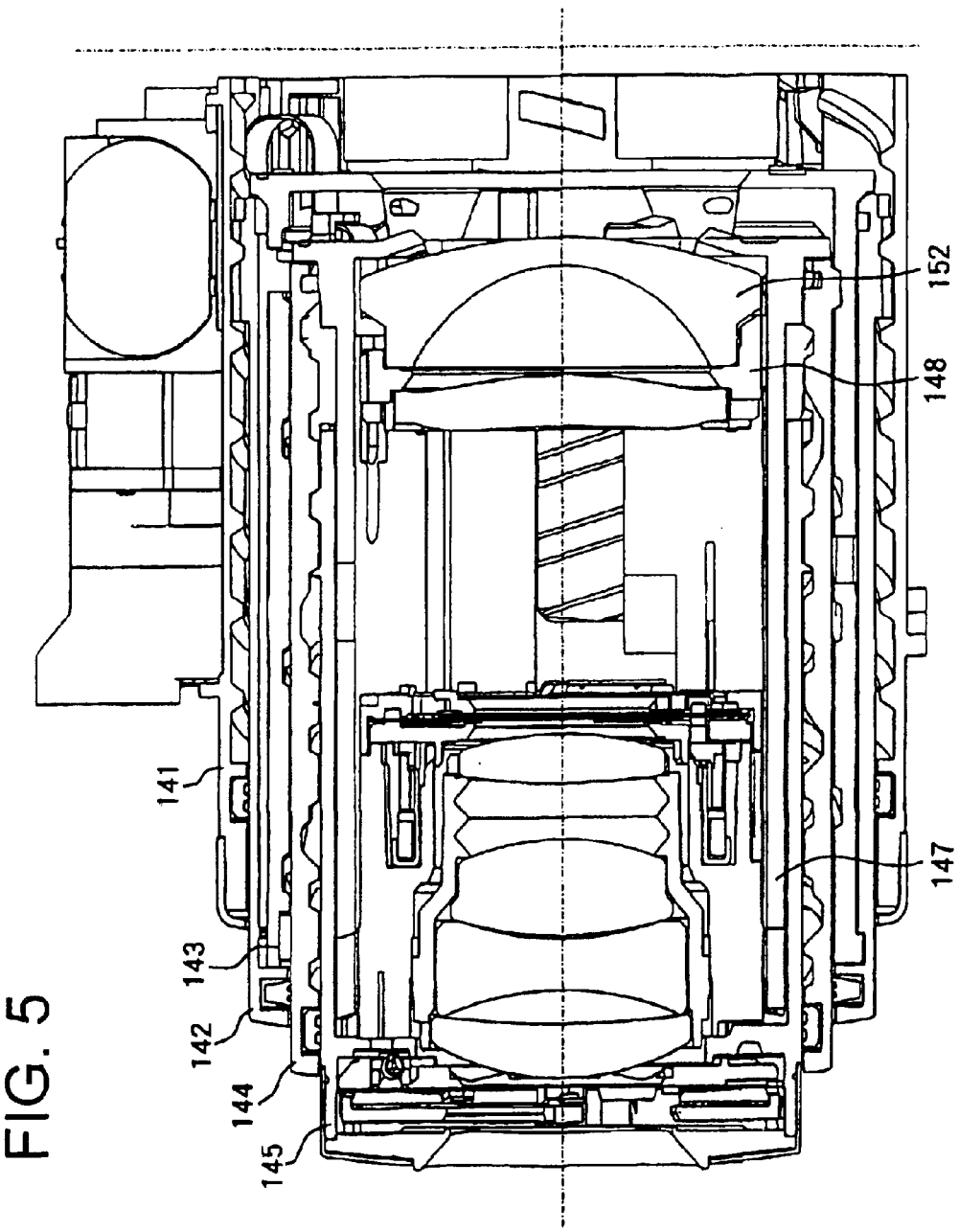
FIG. 5 is a cross-sectional view of the barrel in the wide-angle state.
Figure 6:
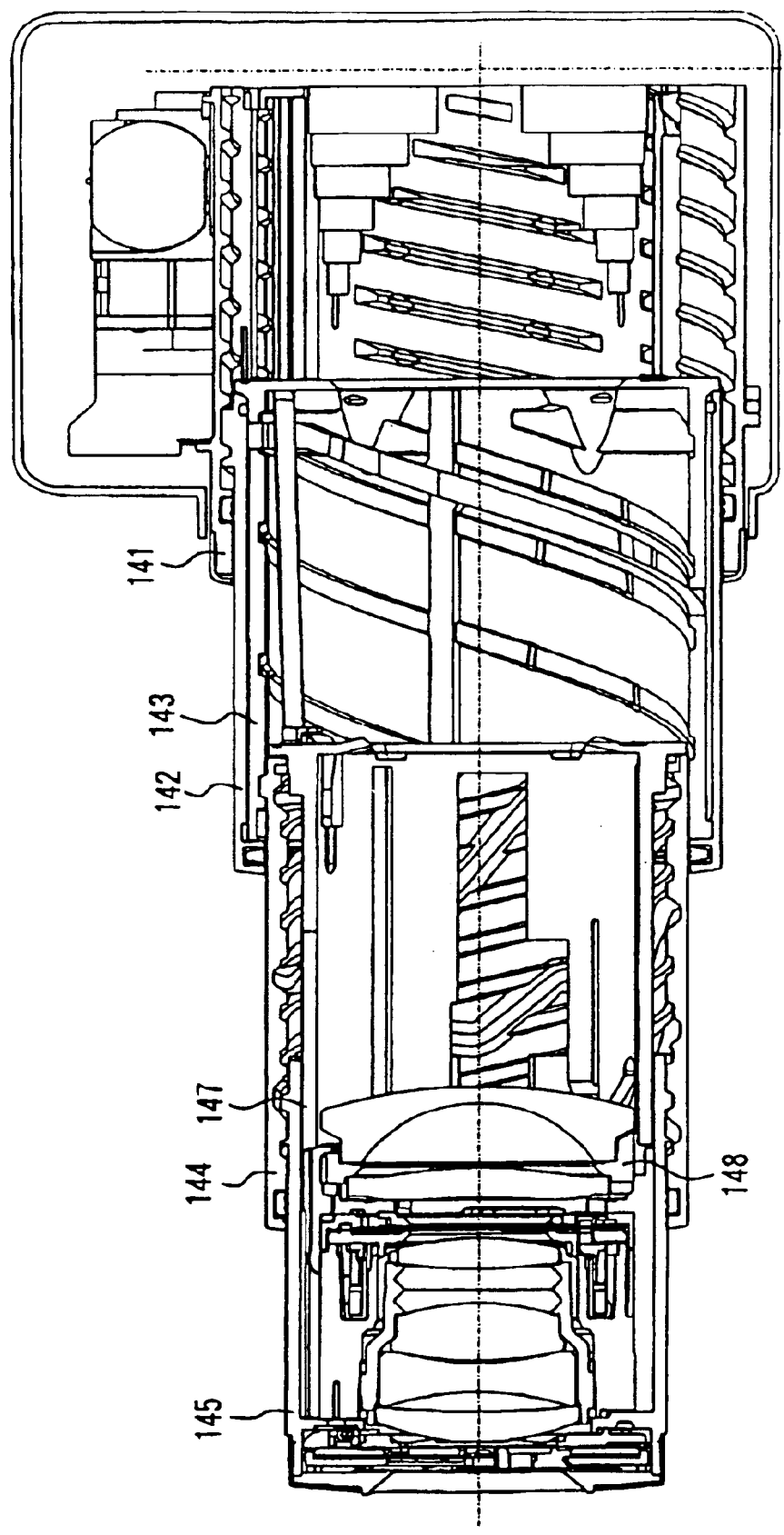
FIG. 6 is a cross-sectional view of the barrel in the telephoto state.
Figure 7:
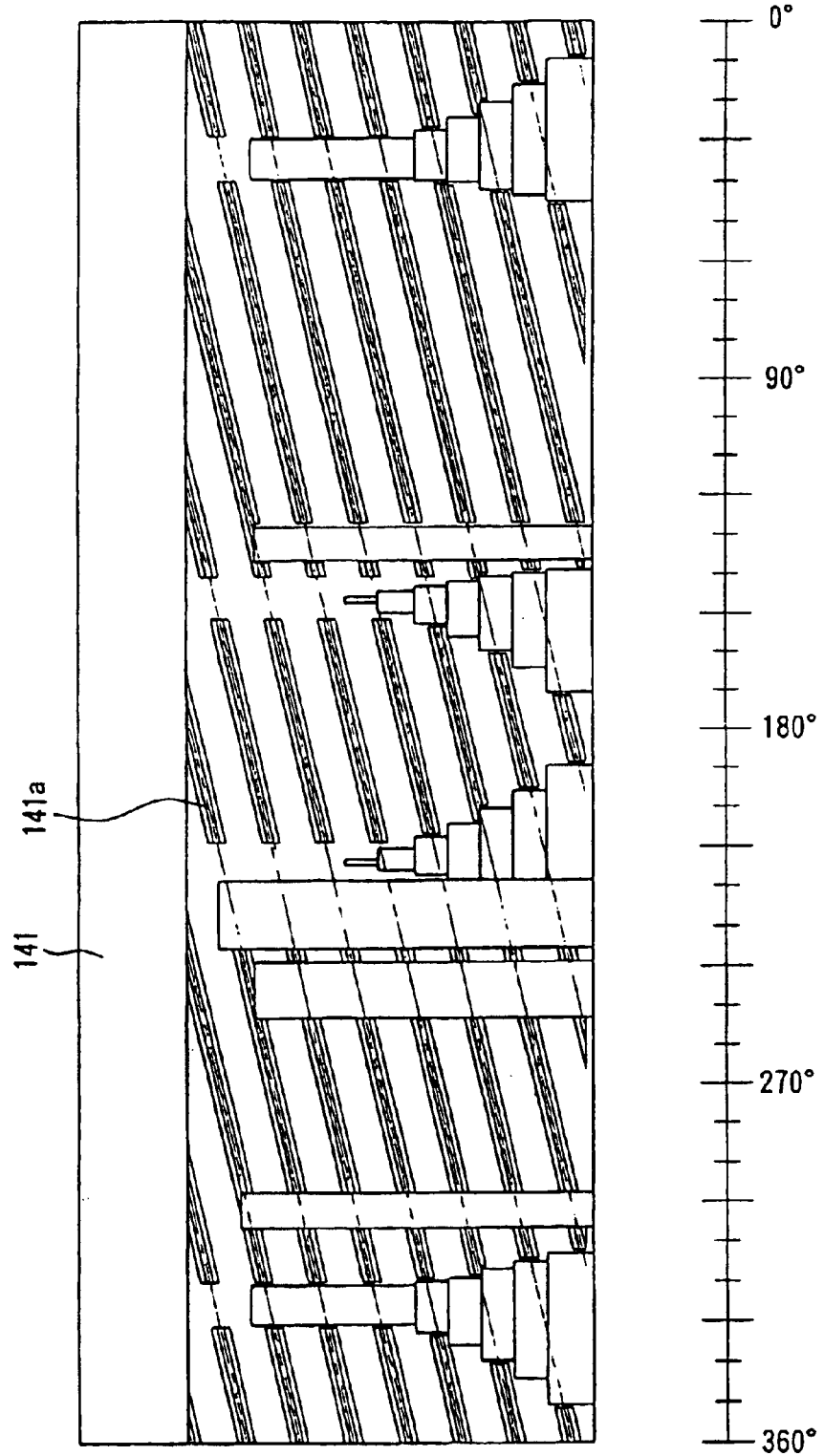
FIG. 7 is a development diagram of the fixed tube.

The following is an explanation of the operation of moving the lens barrel from the collapsed state shown in FIG. 4 to the wide standby state shown in FIG. 5.

When the camera operator turns on a switch (not shown in the drawings) on the camera body, a drive force is transmitted from the motor 108 to the first differential tube 142, and the first differential tube 142 is thrust out in the direction of the optical axis while being rotated around the optical axis due to the engaging action with the fixed tube 141.

After the drive pin 151 of the second differential tube 144 has been moved temporarily from the position 143b1 to the position 143b5 in the first cam groove 143b in FIG. 8, it returns to the position 143b2. Thus, the second differential tube 144 protrudes from the first rectilinear tube 143 by a distance in the direction of the optical axis (lateral direction in FIG. 8) corresponding to the distance between the position 143b1 and the position 143b2.

After the group 1 helicoid 145a of the group 1 lens barrel 145 has moved temporarily from the position 144b1 to the position 144b5 in the second cam groove 144b in FIG. 10, it returns to the position 144b2.

Figure 11:
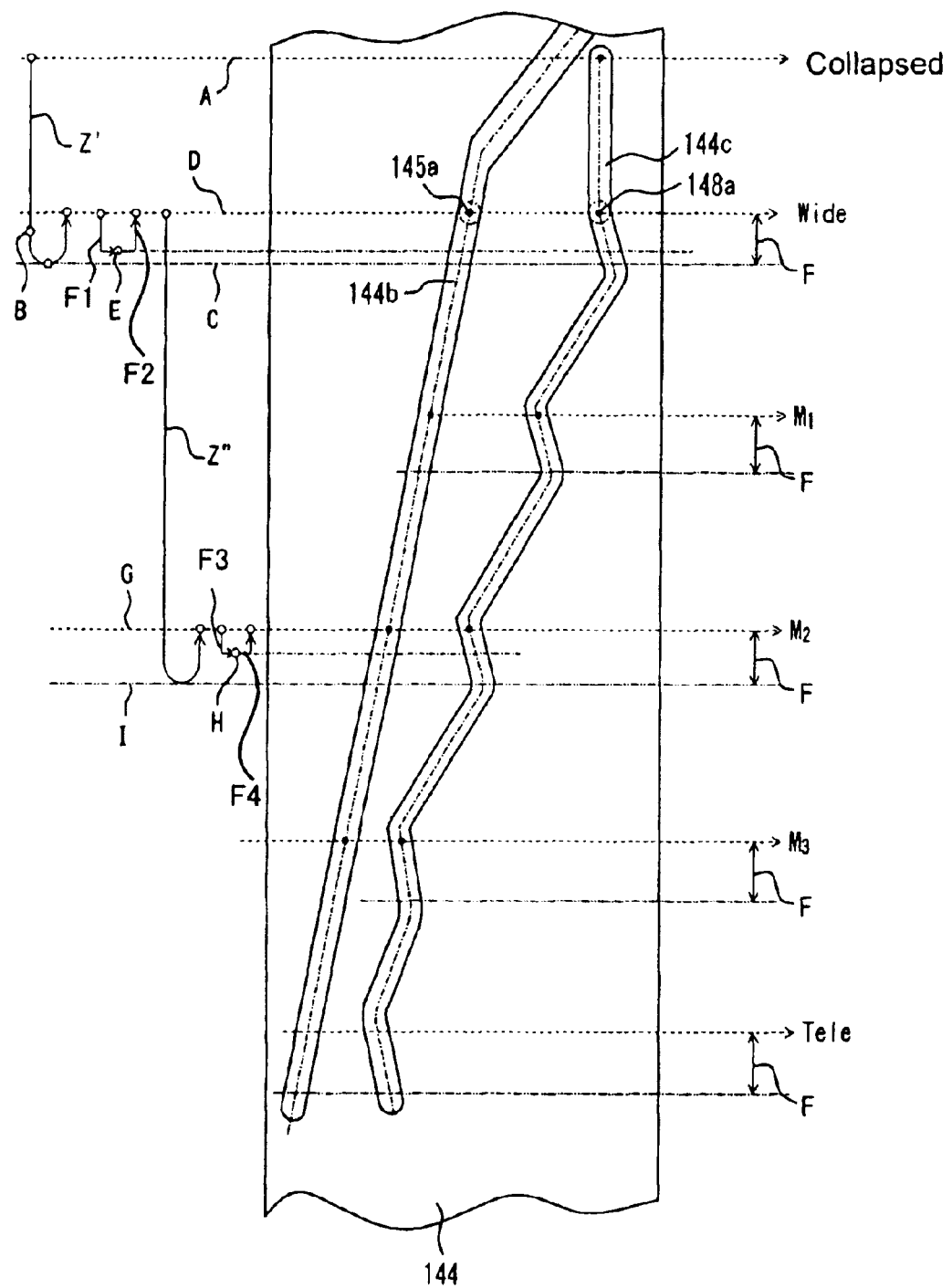
FIG. 11 is a diagram illustrating zooming from the collapsed state to the wide standby state, as well as from the wide standby state to the M2 state, and focusing.

That is to say, as indicated by the arrow Z' in FIG. 11, the group 1 helicoid 145a is first moved, by rotating the motor 108 in one direction, from a position A through positions D and B to a position C. Then, by stopping and rotating the motor 108 in the other direction, it is returned from the position C to the position D. Stopping the group 1 helicoid 145a in the D position, the lens barrel assumes the wide standby state.

Through the above-described operation, the group 1 lens barrel 145 protrudes from the second differential tube 144 by a distance in the direction of the optical axis (lateral direction in FIG. 10) corresponding to the distance between the position 144b1 and the position 144b2.

After the group 2 cam pins 148a of the group 2 lens holder 148 have been moved temporarily from the position 144c1 to the position 144c5 in the third cam grooves 144c in FIG. 10, they return to the position 144c2. Thus, the second lens holder 148 is pulled back in with respect to the second differential tube 144 by a distance in the direction of the optical axis (lateral direction in FIG. 10) between the position 144c1 and the position 144c2.

With this operation, the lens barrel is driven from the collapsed state (FIG. 4) to the wide standby state (FIG. 5).

The following is an explanation of the image-taking operation of a camera when its lens barrel is in the wide-angle state.

When the lens barrel is in the wide-angle state and the camera operator pushes the release button 130 down to the first stroke, then the distance measurement module 117 performs a distance measurement in accordance with a signal output from the logic control circuit 116. Then, the measurement result of the distance measurement module 117 is sent to the object distance detection circuit 114, and after being digitalized, it is sent to the microcomputer 113. On the other hand, a digital signal indicating the focal length information (wide) during image-taking is given to the microcomputer 113 as the output of the zooming signal processing circuit 115.

The microcomputer 113 makes the calculation indicated in Table 1, in accordance with the output from the object distance detection circuit 114 and the zooming signal processing circuit 115. At a wide focal length of f=35 mm (output signal "10"), assuming that the object distance is for example 4 m (output signal "1"), the microcomputer 113 stores the number "11" obtained by adding these two signals as indicated in Table 1, and this value is taken as the reference value of the comparator 112a.

By rotating the motor 108 into one direction based on the signal output from the logic control circuit 116, the motor control circuit 111 rotates the first differential tube 142 around the optical axis, such that the lens barrel is shifted from the wide-angle state toward the telephoto state. The rotation of the motor 108 is converted by the pulse plate 301a and the PI 122 into pulse signals, which are detected by the pulse detection circuit 110 and output to the comparator 112a.

The pulse signals are output one after the other from the PI 122, in accordance with the rotation in the forward direction of the motor 108, until eventually a pulse number of 11 is reached, whereupon the output of the comparator 112a is inverted and an end signal is output. Thus, the motor control circuit 111 electrically brakes the motor 108 and stops it by shorting the two terminals of the motor 108.

By controlling the rotation of the motor 108 in the above-described manner, the first differential tube 142 is thrust out in the direction of the optical axis while being rotated around the optical axis due to the engaging action with the helicoid of the fixed tube 141. In this situation, the drive pin 151 of the second differential tube 144 moves along the first cam groove 143b as the first differential tube 142 is rotated. Then, the drive pin 151 stops at a predetermined position in accordance with the object distance between the position 143b3 (infinity) and position 143b4 (close range) in the first cam groove 143b in FIG. 8.

In this situation, the group 1 helicoid 145a of the group 1 lens barrel 145 moves to a predetermined position in accordance with the object distance between the position 144b3 (infinity) and position 144b4 (close range) in the second cam groove 144b in FIG. 10. That is to say, as shown by the arrow F1 in FIG. 11, the group 1 helicoid 145a at position D is moved to position E (predetermined position between D and C that corresponds to the object distance) in response to operating the release button 130 to the first stroke, and is then stopped.

Furthermore, the group 2 cam pins 148a of the group 2 lens holder 148 move to a predetermined position in accordance with the object distance between the position 144c3 (infinity) and position 144c4 (close range) in the third cam groove 144c in FIG. 10. That is to say, as shown by the arrow F1 in FIG. 11, the group 2 cam pins 148a at position D are moved to the position E in response to operating the release button 130 to the first stroke, and are then stopped.

Through this thrust-out operation of the lens barrel, the first lens group 160 held by the group 1 lens barrel 145 and the second lens group 152 held by the group 2 lens barrel 148 can be advanced and retracted in the direction of the optical axis, and the focus can be adjusted to the object between infinity and close range.

When the operator pushes the release button 130 down to the second stroke after the focus has been adjusted, the film is exposed by opening and closing the shutter blades. Then, when the release button 130 is restored to the state it was in before it was pushed by the camera operator, the motor 108 is rotated in the reverse direction with an output signal from the motor control circuit 111, which has obtained a command from the logic control circuit 116. Thus, the first differential tube 142 is operated such that the lens barrel assumes the wide standby state, and is returned to the wide standby state before the focus adjustment.

Here, as indicated by the arrow F2 in FIG. 11, the group 1 helicoid 145a of the group 1 lens barrel 145 and the group 2 cam pins 148a of the group 2 lens holder 148 in position E are returned to and stopped at the position D.

When the first differential tube 142 has returned to the wide standby state, the comparator 112b is inverted and the drive of the motor 108 is stopped. Then, the photographic film is transported forward by one frame by a film transport mechanism as known in the art, and the camera assumes the state it was in before the release button 130 was operated.

It should be noted that in the present embodiment, five zoom positions with focal lengths of 35 to 150 mm are provided, but it is also possible to provide a larger or a smaller number of zoom positions.

Moreover, in this embodiment, the pulse plate 301a and the pulse detection circuit 110 are provided to perform the position detection of the image-taking lens and to determine the stop timing of the motor 108, but there is no limitation to this. For example, it is also possible to determine the position of the image-taking lens by using a pulse motor as the motor 108 and rotating this pulse motor in accordance with a number of output pulses given by the microcomputer 113. This way it is not necessary to use the pulse plate 301a, the pulse detection circuit 110 and the comparator 112a, and the position of the image-taking lens can be controlled by directly inputting the output of the microcomputer 113 into the motor control circuit 111.

The following is an explanation of the zooming operation when switching the zoom position from wide to M2, and of an image-taking operation at M2.

When the image-taking lens is at the wide position, and the operator has continuously operated the zooming operation member 118 for a predetermined time so that the zooming signal processing circuit 115 has determined that the zoom position is M2, then the motor 108 is rotated in the forward direction in order to move the image-taking lens to a position corresponding to M2. Thus, as indicated by the arrow Z" in FIG. 11, the group 1 helicoid 145a and the group 2 cam pins 148a are moved from the position D through the positions C and G to the position I.

Then, when the group 1 helicoid 145a and the group 2 cam pins 148a have been moved to the position I, the motor control circuit 111 stops the rotation of the motor 108 in the forward direction, and rotates it in the reverse direction, thereby returning the group 1helicoid 145a and the group 2 cam pins 148a to the position G.

When the lens barrel is in the M2 state and the camera operator pushes the release button 130 of the camera body down to the first stroke, the microcomputer 113 drives the motor 108 in order to adjust the focus in accordance with the object distance. The drive force of the motor 108 is transmitted to the first differential tube 142, and the group 1 helicoid 145a of the group 1 lens barrel 145 is moved from the position G to the position H (predetermined position between G and I that corresponds to the object distance) in the second cam grooves 144b, as indicated by the arrow F3 in FIG. 11.

Furthermore, the group 2 cam pins 148a of the group 2 lens holder 148 move from the position G to the position H in the third cam grooves 144c, as indicated by the arrow F3 in FIG. 11.

Focus adjustment is carried out by moving the group 1 helicoid 145a and the group 2 cam pins 148a to the position H. Then, when the release button 130 is pushed down to the second stroke, exposure is performed by opening and closing the shutter blades. After the exposure operation has finished, the group 1 helicoid 145a and the group 2 cam pins 148a are moved to the position G in FIG. 11, and the film is transported forward by one frame.

The following is an explanation of the zooming operation when switching the zoom position from M2 to telephoto, and of an image-taking operation in the telephoto state.

When the image-taking lens is at the M2 position, and the operator has continuously operated the zooming operation member 118 for a predetermined time, the zooming signal processing circuit 115 determines the zoom position. Here, if the zoom operation member 118 is operated in the direction toward the telephoto end and the operation time is at least 0.6 sec, then it is determined that the zoom position is the telephoto position.

If it has been determined that the zoom position is the telephoto state, the motor 108 is rotated in the forward direction in order to shift the image-taking lens to the telephoto position. Thus, the group 1helicoid 145a and the group 2 cam pins 148a, which are in position G in FIG. 12, are moved through the positions I and T to the position S, as indicated by the arrow Z in FIG. 12.

When the group 1 helicoid 145a and the group 2 cam pins 148a have been moved to the position S, the rotation of the motor 108 in the forward direction is stopped, and the motor 108 is rotated into the reverse direction, thereby returning the group 1helicoid 145a and the group 2 cam pins 148a to the position T.

When the lens barrel is in the telephoto state and the camera operator pushes the release button 130 of the camera body down to the first stroke, the microcomputer 113 drives the motor 108 in order to adjust the focus in accordance with the object distance. The drive force of the motor 108 is transmitted to the first differential tube 142, and the group 1 helicoid 145a of the group 1 lens barrel 145 is moved from the position T to the position U in the second cam grooves 144b as indicated by the arrow F5 in FIG. 12.

Figure 12:
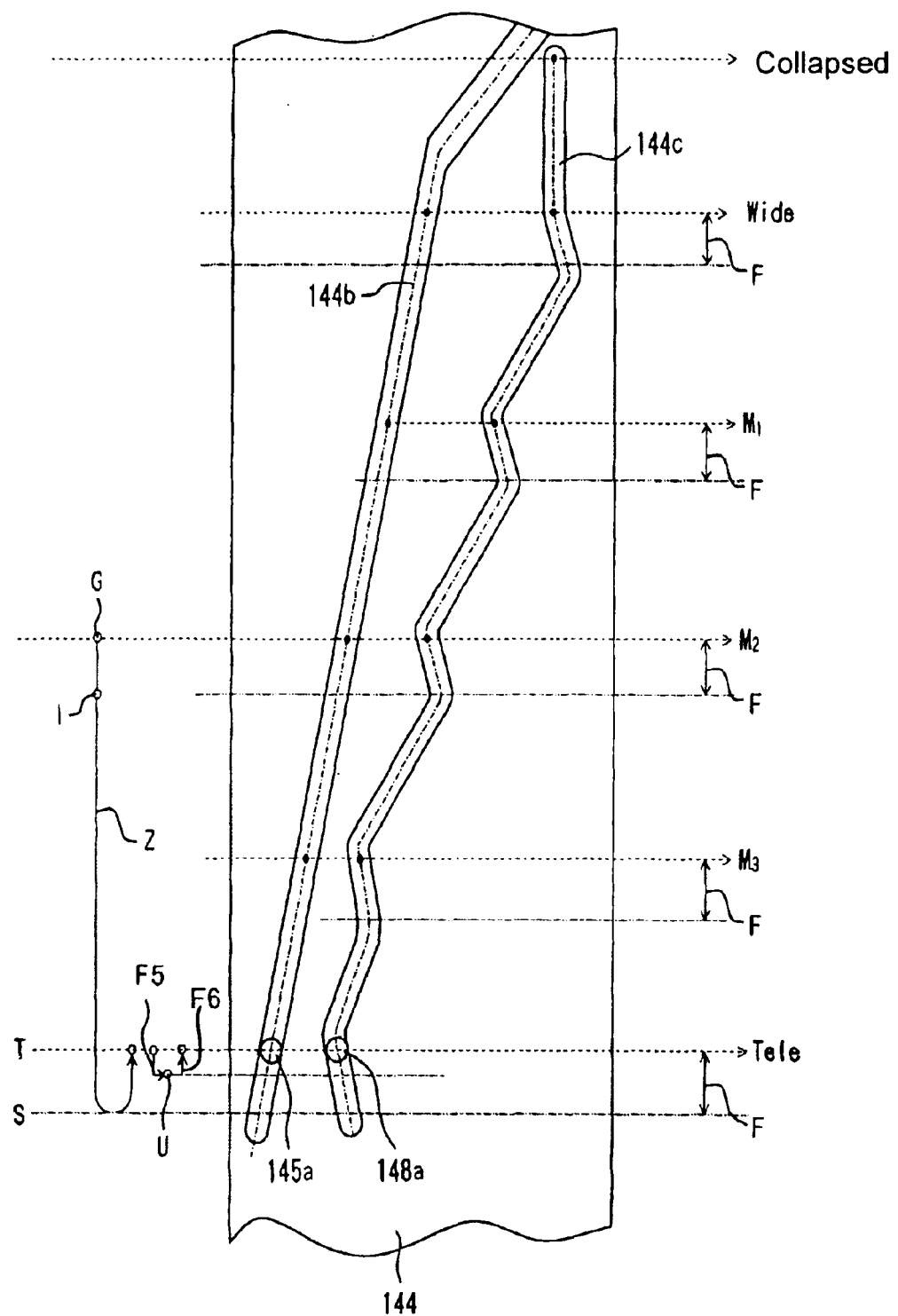
FIG. 12 is a diagram illustrating zooming from the M2 state to the telephoto state, and focusing.

Furthermore, the group 2 cam pins 148a of the group 2 lens holder 148 move from the position T to the position U in the third cam grooves 144c, as indicated by the arrow F5 in FIG. 12.

Focus adjustment is carried out by moving the group 1 helicoid 145a and the group 2 cam pins 148a to the position U. Then, when the release button 130 is pushed down to the second stroke, exposure is performed by opening and closing the shutter blades. After the exposure operation has finished, the group 1 helicoid 145a and the group 2 cam pins 148a are moved to the position T as shown by the arrow F6 in FIG. 12, and the film is transported forward by one frame.

The following is an explanation of the operation of switching the aperture diameter of the shutter blades.

Figure 13:
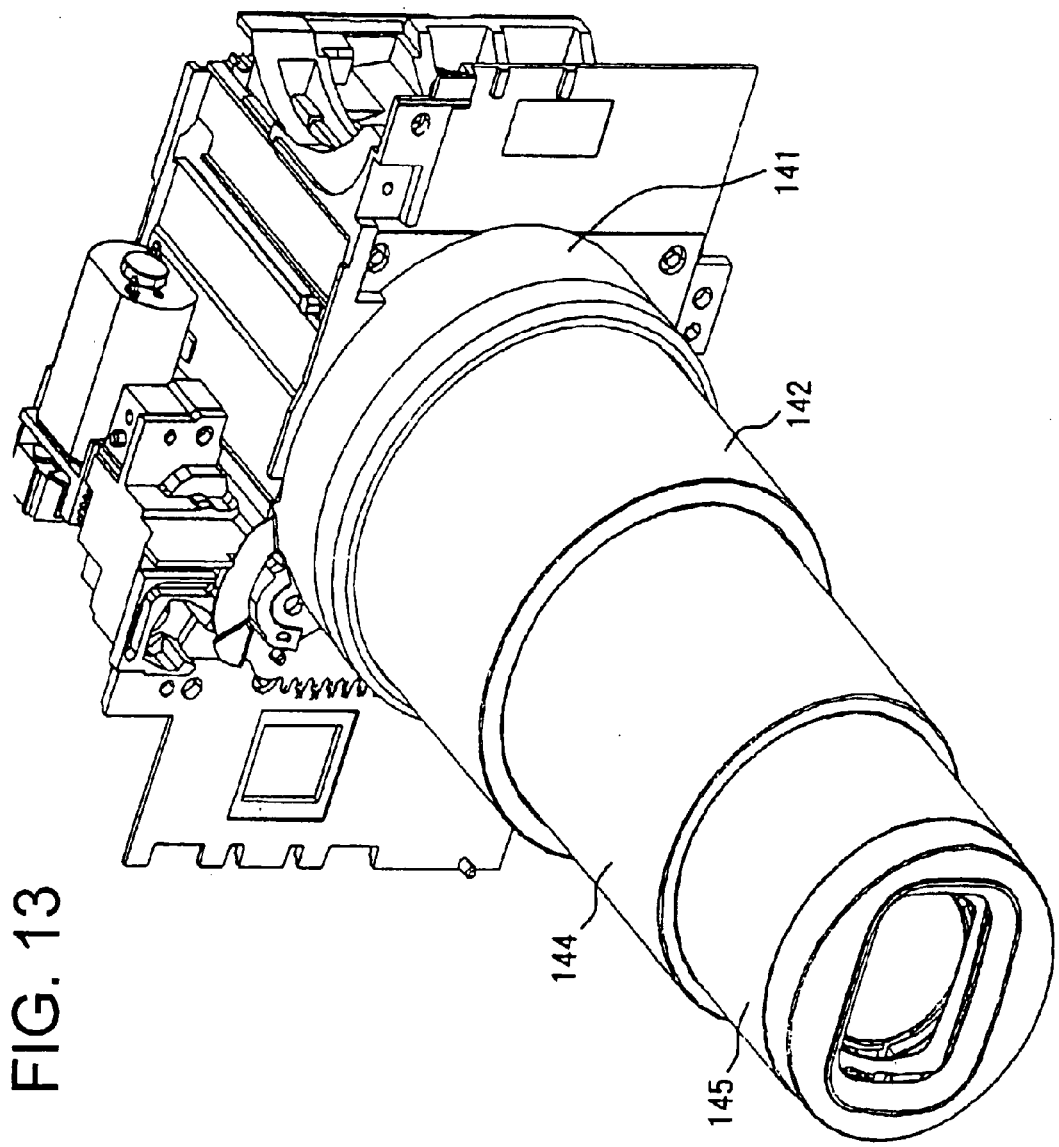
FIG. 13 is an outside perspective view of the barrel in the telephoto standby state.
Figure 14:
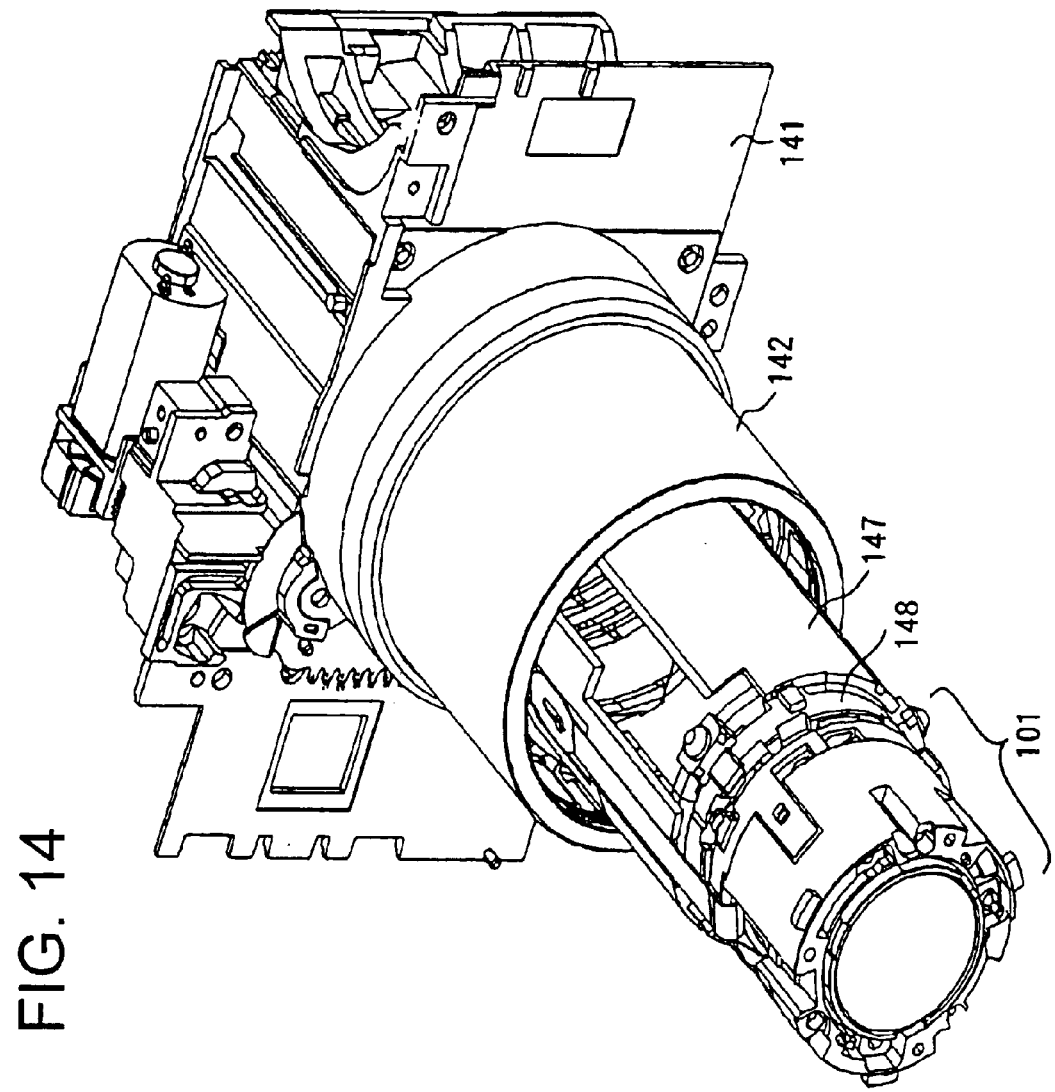
FIG. 14 is a perspective view of the barrel in the telephoto standby state.

First, the operation of the shutter blades is explained for the case that the focal length is in the telephoto state. FIG. 13 is an outside perspective view of the lens barrel in the telephoto state. FIG. 14 is a diagram in which the group 1 lens barrel 145 and the second differential tube 144 have been omitted from FIG. 13, exposing the shutter device 101 and the second rectilinear motion tube 147 which are arranged inside the lens barrel.

Figure 15:
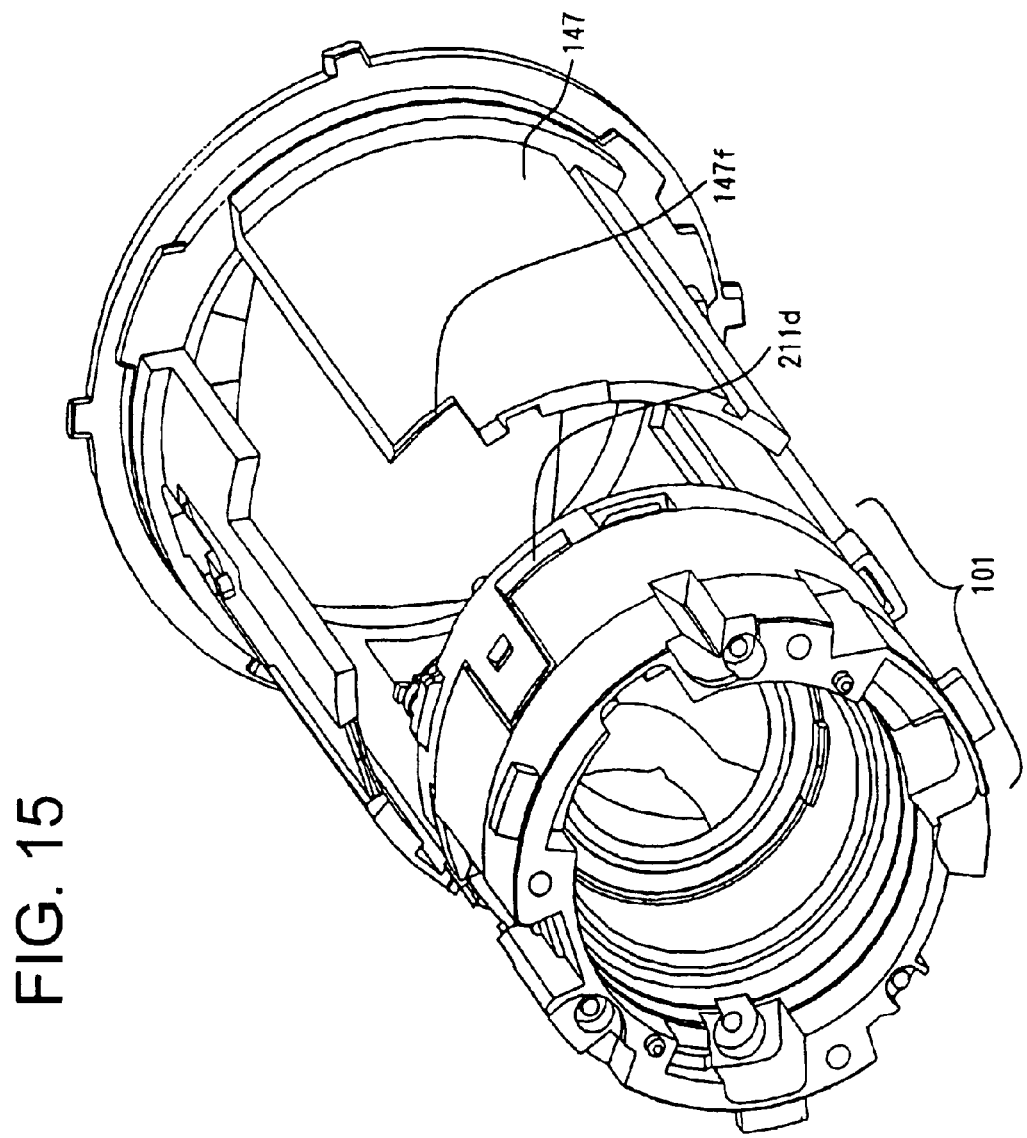
FIG. 15 is an outside perspective view of the shutter device and the second rectilinear motion tube.
Figure 16:
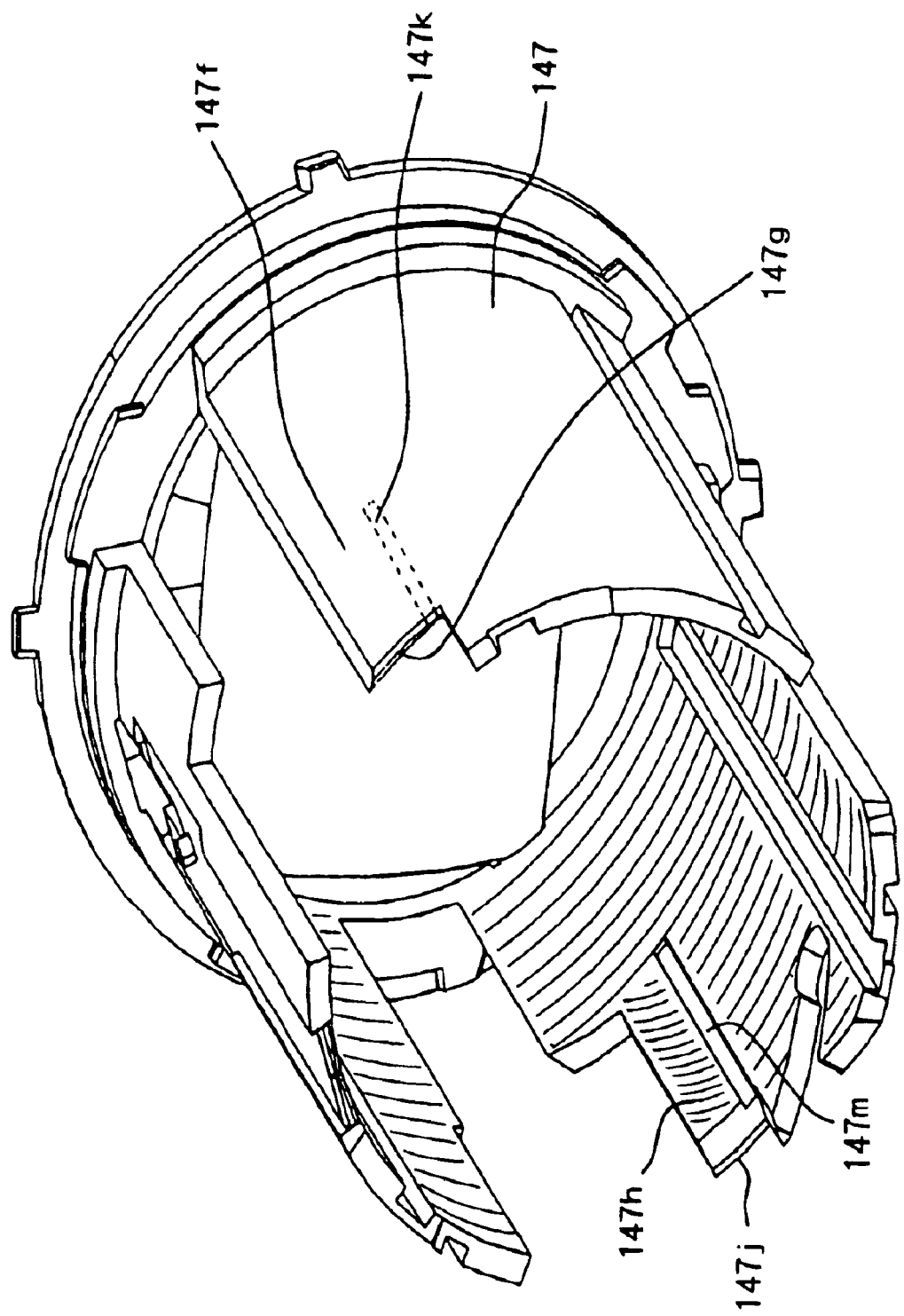
FIG. 16 is an outside perspective view of the second rectilinear motion tube.

FIG. 15 is a diagram showing the positional relation of the shutter device 101 and the second rectilinear motion tube 147 in the telephoto state, and FIG. 16 is an outside perspective view of the second rectilinear motion tube 147.

As shown in FIG. 16, a first catching portion (contact portion) 147f, which is abutted in the wide-angle state by an abutting protrusion (nose portion) 208c of the first shutter blade 208, and a second catching portion (contact portion) 147h, which is abutted in the wide-angle state by an abutting protrusion (nose portion) 214c of the fourth shutter blade 214, are formed on the inner circumferential surface of the second rectilinear tube 147.

Here, lubricating oil is applied to all regions of the inner circumferential surface of the second rectilinear motion tube 147 except for the first catching portion 147f and the second catching portion 147h, and longitudinal slits 147k and 147m are formed in the second rectilinear motion tube 147, such that this lubricating oil does not spread to the catching portions 147f and 147h and adhere to the abutting protrusions 208c and 214c of the shutter blades.

Moreover, to prevent unnecessary reflections of light inside the lens barrel, the inner circumferential surface of the second rectilinear motion tube 147 is provided with a corrugated structure of reflection suppressing projections extending in circumferential direction. Here, in the regions of the first catching portion 147f and the second catching portion 147h the reflection suppressing projections are tilted with respect to the direction of the optical axis.

If the reflection suppressing projections in the first catching portion 147f and the second catching portion 147h were formed in the circumferential direction of the second rectilinear motion tube 147 (that is, such that the plane including one light-blocking line is perpendicular to the optical axis), then there would be the risk that the abutting protrusions 208c and 214c of the shutter blades get caught in the grooves of the reflection suppressing projections when the shutter blades are spread open, making the open-close motion of the shutter blades unreliable. For this reason, tilting the reflection suppressing projections with respect to the optical axis prevents the abutting protrusions 208c and 214c of the shutter blades from getting caught in the grooves of the reflection suppressing projections, so that the open-close motion of the shutter blades can be carried out smoothly.

FIG. 17 is a front view of the shutter device when the shutter blades are in the closed position. In FIG. 17, the four shutter blades 208, 209, 213 and 214 are partially overlapping, covering the aperture portion 211f in the shutter plate 211. In this situation, the abutting protrusion 208c of the first shutter blade 208 and the abutting protrusion 214c of the fourth shutter blade 214 are positioned more inward than the outer circumferential surface of the shutter plate 211.

The tip portion 209c of the second shutter blade 209 is positioned in front of a photo-reflector (PR) 215, and infrared light that is emitted from a light-emitting portion of the PR 215 is blocked by the black shutter blade 209, whose reflectivity is low, so that the light amount that is reflected and reaches a light-receiving portion of the PR 215 is small. Therefore, an OFF signal is transmitted from the PR 215 to the camera body. Based on the signal that is output from the PR 215, the camera body (microcomputer 113) detects that the shutter blades are in a closed state.

Figure 18:
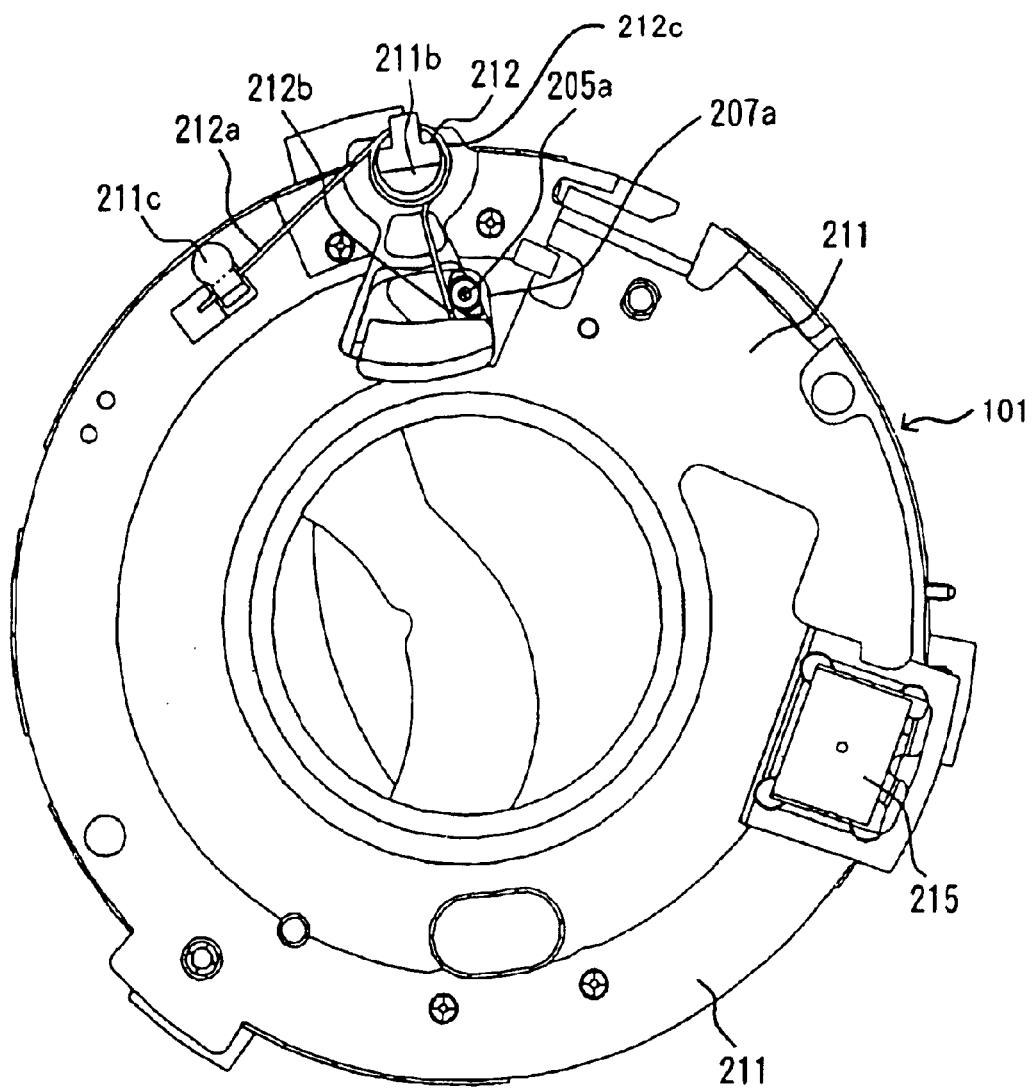
FIG. 18 is a rear view of the shutter device in the telephoto state when the shutter blades are in the closed state.

FIG. 18 is a rear view of the shutter device in the telephoto state, when the shutter blades are in the closed state. The coil portion 212c of the shutter spring 212 engages the spring peg 211b of the shutter plate 211, and one end 212a of the shutter spring 212 engages a boss 211c in the shutter plate 211, whereas the other end 212b abuts against the drive shaft 205a of the shutter rotor 205.

Thus, the shutter spring 212 urges the drive shaft 205a of the shutter rotor 205 in the direction closing the shutter blades, and the drive shaft 205a subject to that spring force abuts against the wall to the side of the angular hole 207a of the second shutter base 207.

FIG. 19 is a front view of the shutter device when the shutter blades are in the open position. In the situation shown in FIG. 18, rotating the shutter rotor 205 around the optical axis by 10° lets the drive shafts 205a and 205b of the shutter rotor 205 rotate the four shutter blades 208, 209, 213 and 214, thereby leading to the situation shown in FIG. 19.

In the situation shown in FIG. 19, the abutting protrusion 208c of the first shutter blade 208 protrudes through the cut-out 211d in the shutter plate 211 and out of the shutter device 101. Also the abutting protrusion 214c of the fourth shutter blade 214 protrudes through the cut-out 211e in the shutter plate 211 and out of the shutter device 101.

Figure 20:
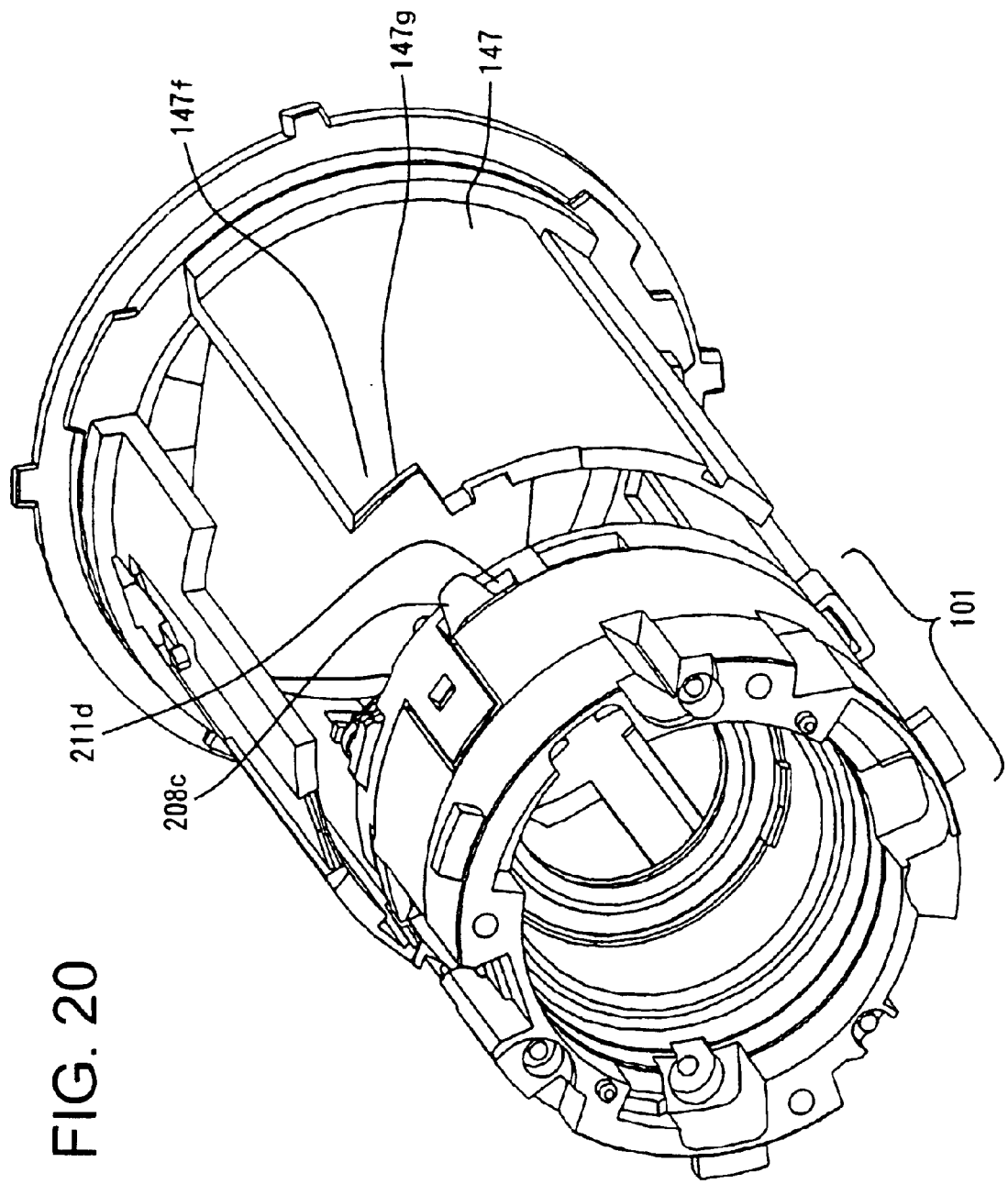
FIG. 20 is an outside perspective view of the shutter device and the second rectilinear motion tube in the telephoto state when the shutter blades are in the open state.

FIG. 20 is an outside perspective view of the shutter device 101 and the second rectilinear motion tube 147, illustrating the situation when the shutter blades are open in the telephoto state. In FIG. 20, the abutting protrusion 208c of the shutter blade 208 protrudes out of the shutter device 101. Moreover, the first catching portion 147f of the second rectilinear motion tube 147 is positioned more to the rear in the direction of the optical axis (more towards the image plane) than the abutting protrusion 208c of the first shutter blade 208, so that it does not obstruct the open-close motion of the first shutter blade 208.

Figure 21:
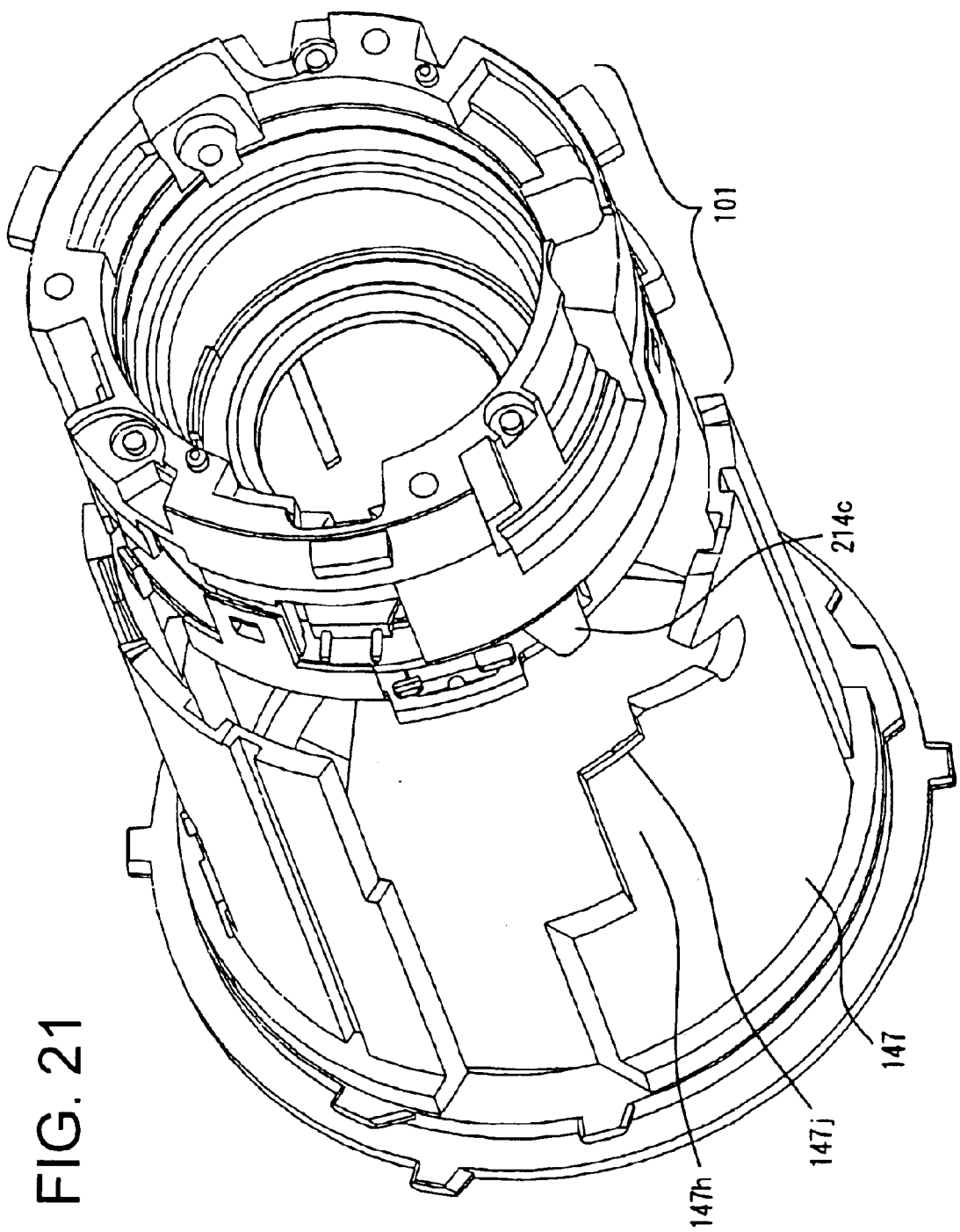
FIG. 21 is an outside perspective view of the shutter device and the second rectilinear motion tube in the telephoto state when the shutter blades are in the open state.

FIG. 21 is a diagram of the shutter device 101 and the second rectilinear motion tube 147 in the same situation as FIG. 20, taken from a different direction than FIG. 20 (namely from below in FIG. 20). In FIG. 21, the abutting protrusion 214c of the fourth shutter blade 214 protrudes out of the shutter device 101. Moreover, the second catching portion 147h of the second rectilinear motion tube 147 is positioned more to the rear in the direction of the optical axis (more towards the image plane) than the abutting protrusion 214c of the fourth shutter blade 214, so that it does not obstruct the open-close motion of the fourth shutter blade 214.

Figure 22:
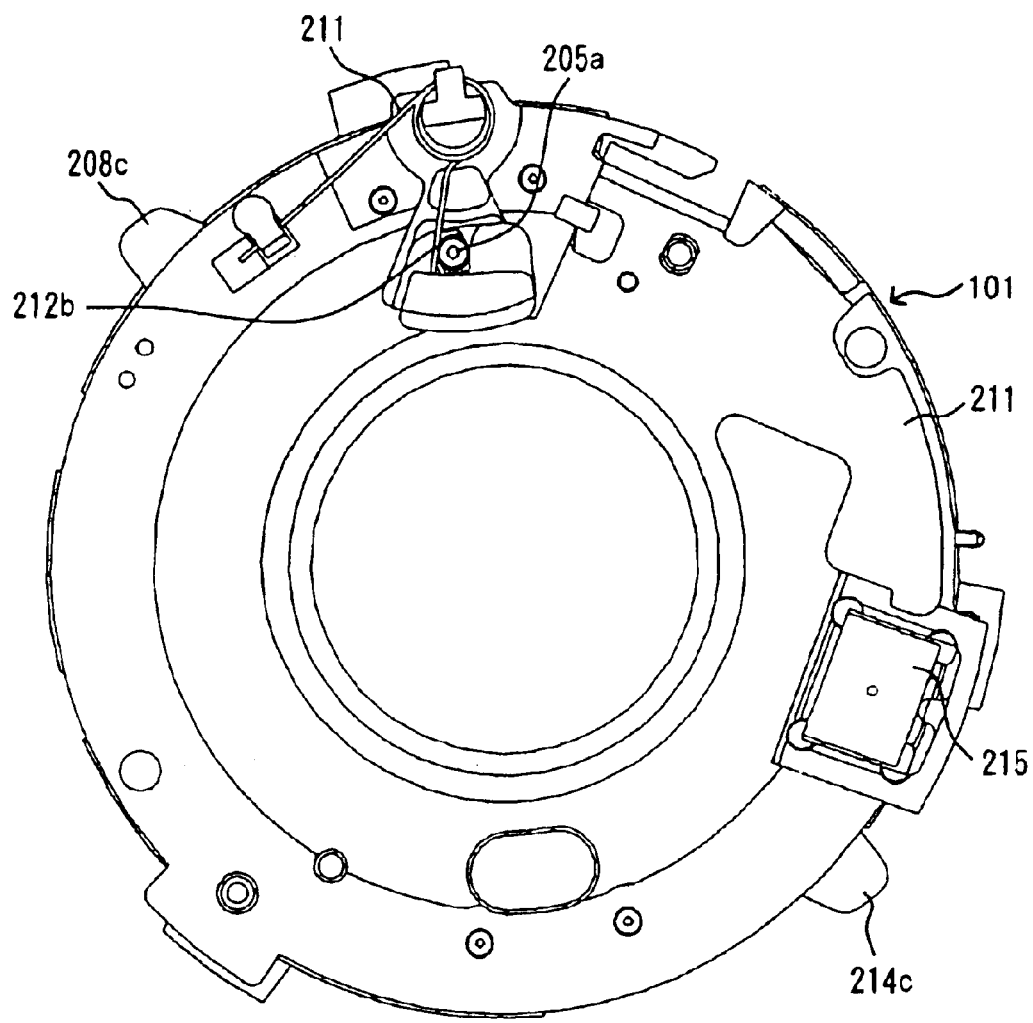
FIG. 22 is a rear view of the shutter device in the telephoto state when the shutter blades are in the open state.
Figure 23:
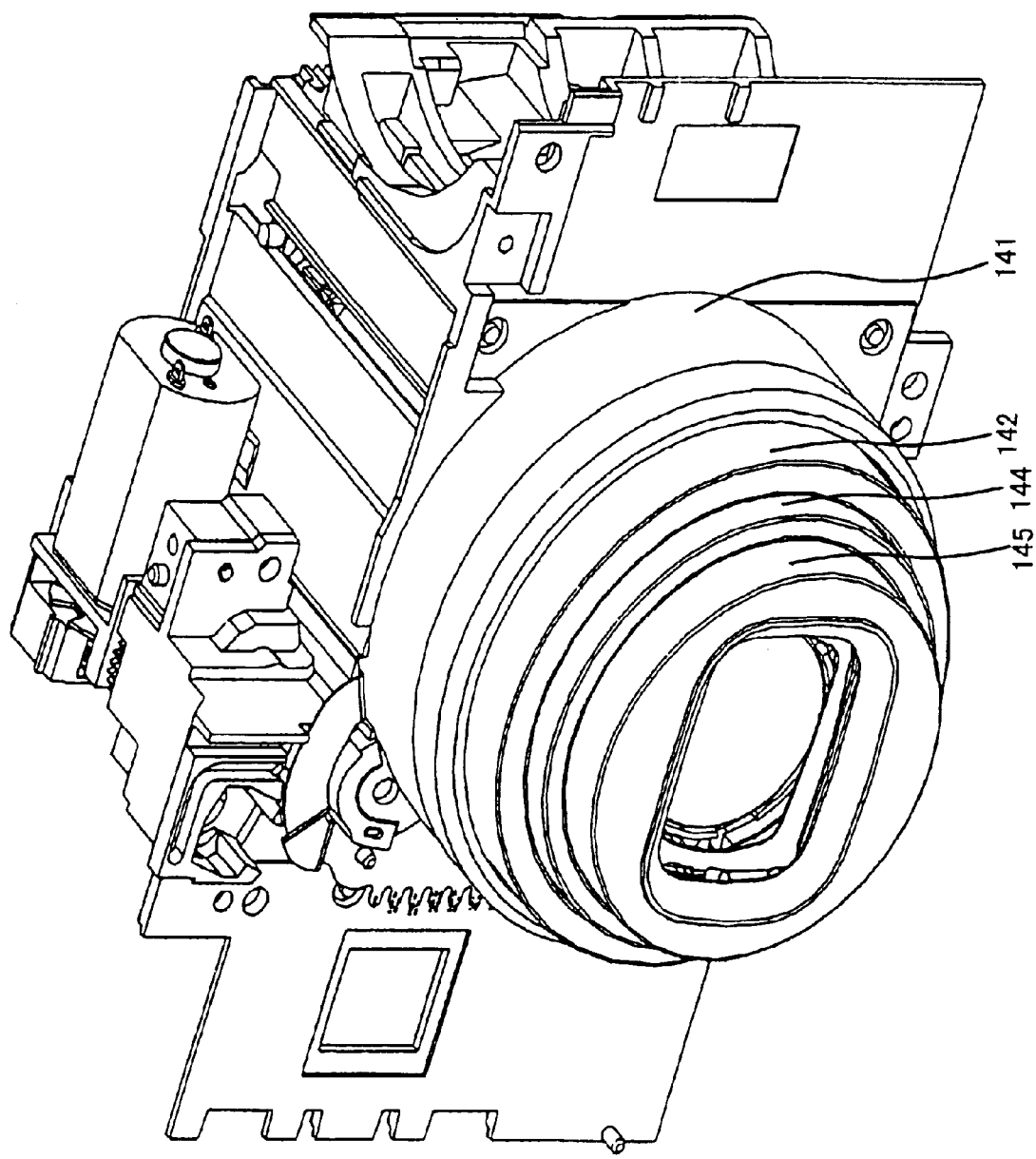
FIG. 23 is an outside perspective view of the barrel in the wide standby state.
Figure 24:
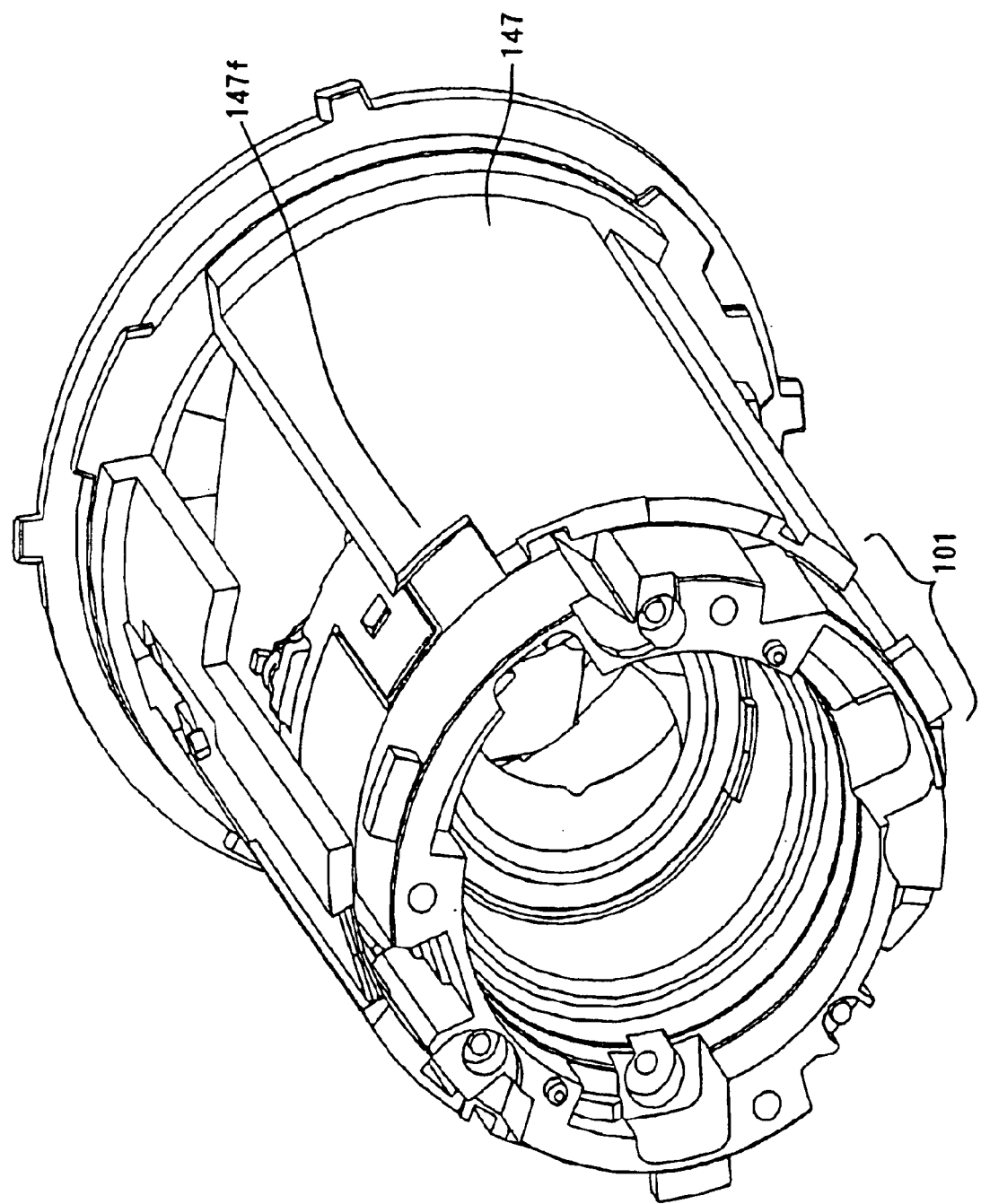
FIG. 24 is an outside perspective view of the shutter device and the second rectilinear motion tube in the wide-angle state when the shutter blades are in the open state.
Figure 26:
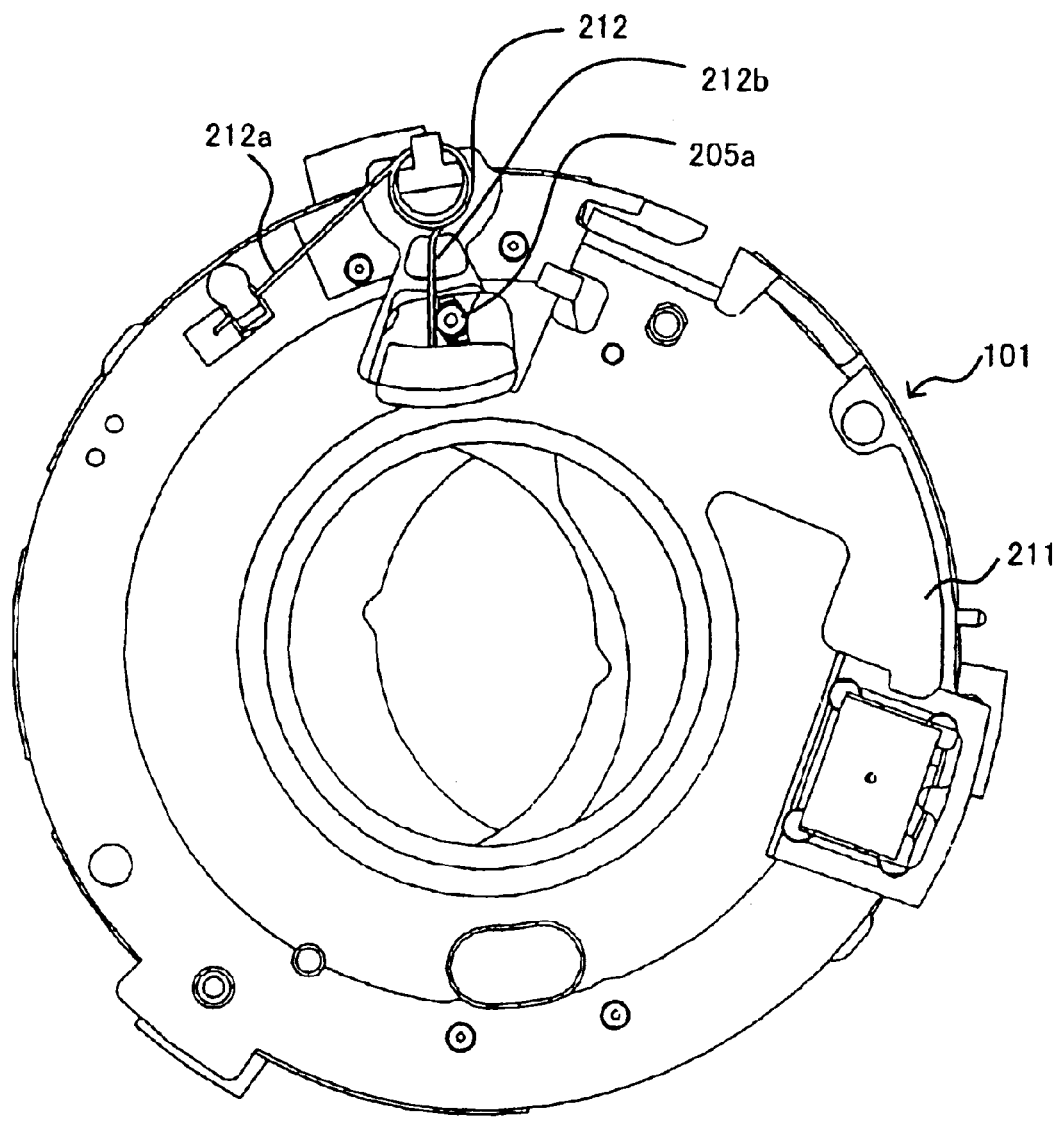
FIG. 26 is a rear view of the shutter device in the wide-angle state when the shutter blades are in the open state.

FIG. 22 is a rear view of the shutter device 101 in the telephoto state, when the shutter blades are in the open state. FIG. 23 is an outside perspective view of the lens barrel in the wide-angle state, and FIG. 24 is an outside perspective view of the shutter device 101 and the second rectilinear motion tube 147 in the wide-angle state. FIG. 26 is a rear view of the shutter device 101 in the wide-angle state.

In the wide-angle state, the shutter device 101 and the second rectilinear motion tube 147 shown in FIG. 24 are close to one another with regard to the direction of the optical axis, and their positional relation is such that the second rectilinear motion tube 147 occludes the outer circumference of the shutter device 101. Here, the first catching portion 147f of the second rectilinear motion tube 147 occludes the cut-out 211d of the shutter plate 211. Furthermore, although it is not shown in the drawings, the second catching portion 147h occludes the cut-out 211e.

Figure 25:
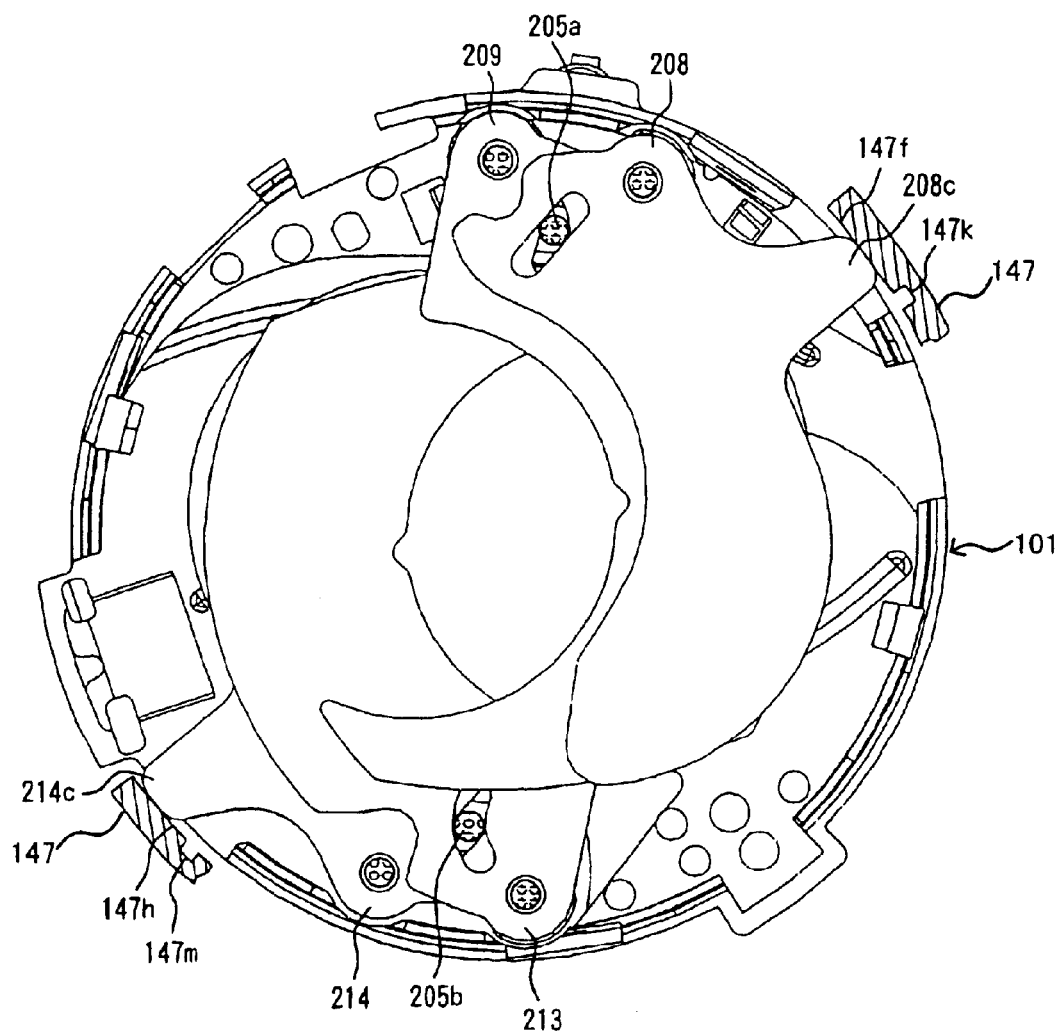
FIG. 25 is a diagram illustrating the arrangement of the shutter blades in the wide-angle state when the shutter blades are in the open state.

In the wide-angle state shown in FIG. 24, when the shutter rotor 205 is rotated by letting a current flow through the coil 203 in order to open the shutter blades, the abutting protrusion 208c of the first shutter blade 208 abuts against the first catching portion 147f of the second rectilinear motion tube 147, and the abutting protrusion 214c of the fourth shutter blade 214 abuts against the second catching portion 147h, as shown in FIG. 25.

For this reason, the shutter blades cannot open any further than this, and the aperture diameter formed by the second shutter blade 209 and the third shutter blade 213 becomes the maximum aperture diameter of the shutter blades. In this embodiment, the maximum aperture diameter of the shutter blades in the wide-angle state is smaller than the maximum aperture diameter of the shutter blades in the telephoto state, so that the opening operation of the shutter blades in the wide-angle state is blocked midway.

Here, the radius of curvature at the tip of the abutting protrusions 208c and 214c of the shutter blades is smaller than the radius of curvature of the catching portions 147f and 147h of the second rectilinear motion tube 147. Thus, when the abutting protrusions 208c and 214c abut against the catching portions 147f and 147h, point contact is established and the contact position is fixed, improving the precision of the aperture diameter of the shutter blades.

FIGS. 27 to 30 are schematic diagrams illustrating the switching operation of the aperture diameter of the shutter blades, and show the shutter device 101 and the second rectilinear motion tube 147 in a simplified fashion.

Figure 27:
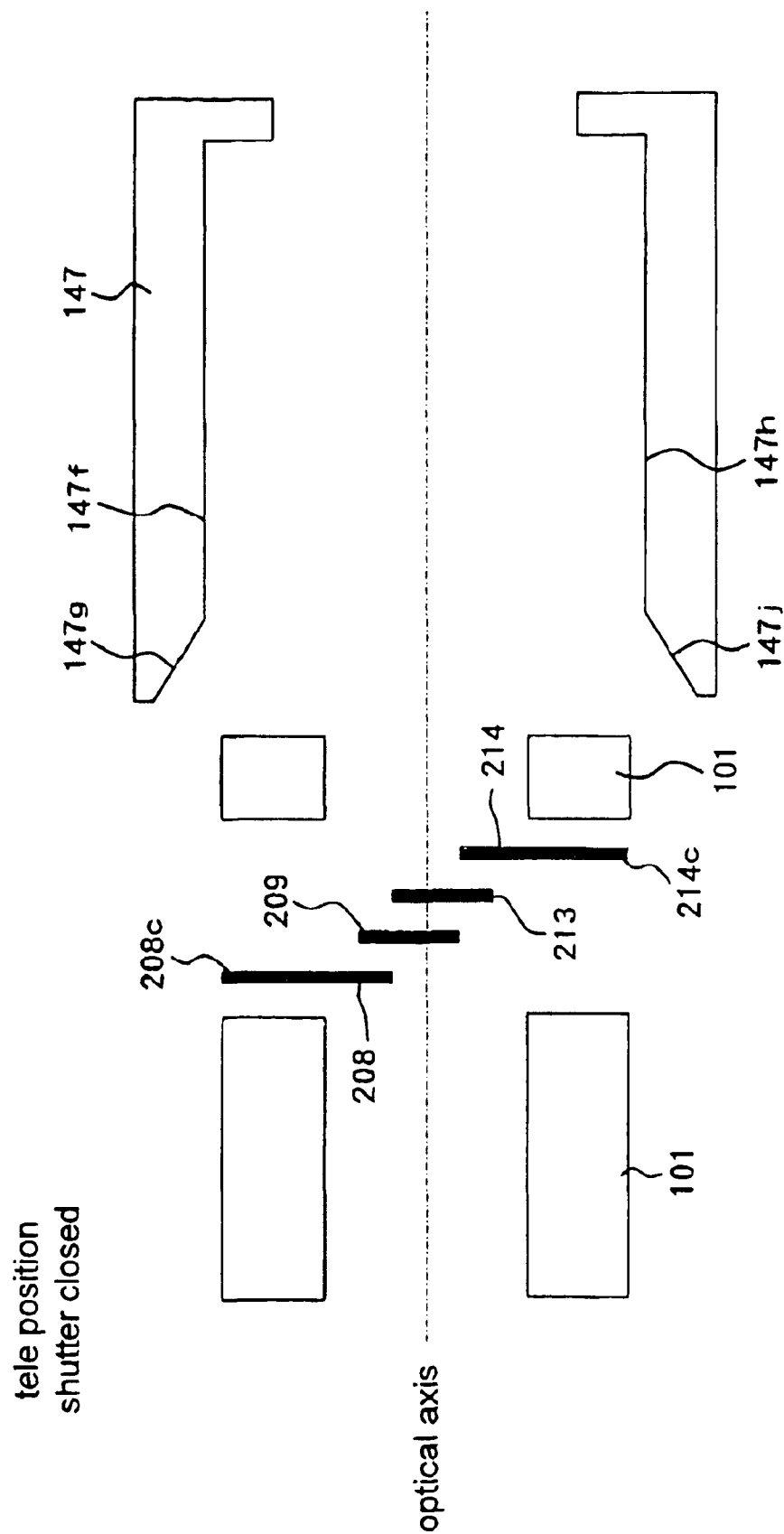
FIG. 27 is a schematic view of the shutter device and the second rectilinear motion tube in the telephoto state when the shutter blades are in the closed state.
Figure 28:
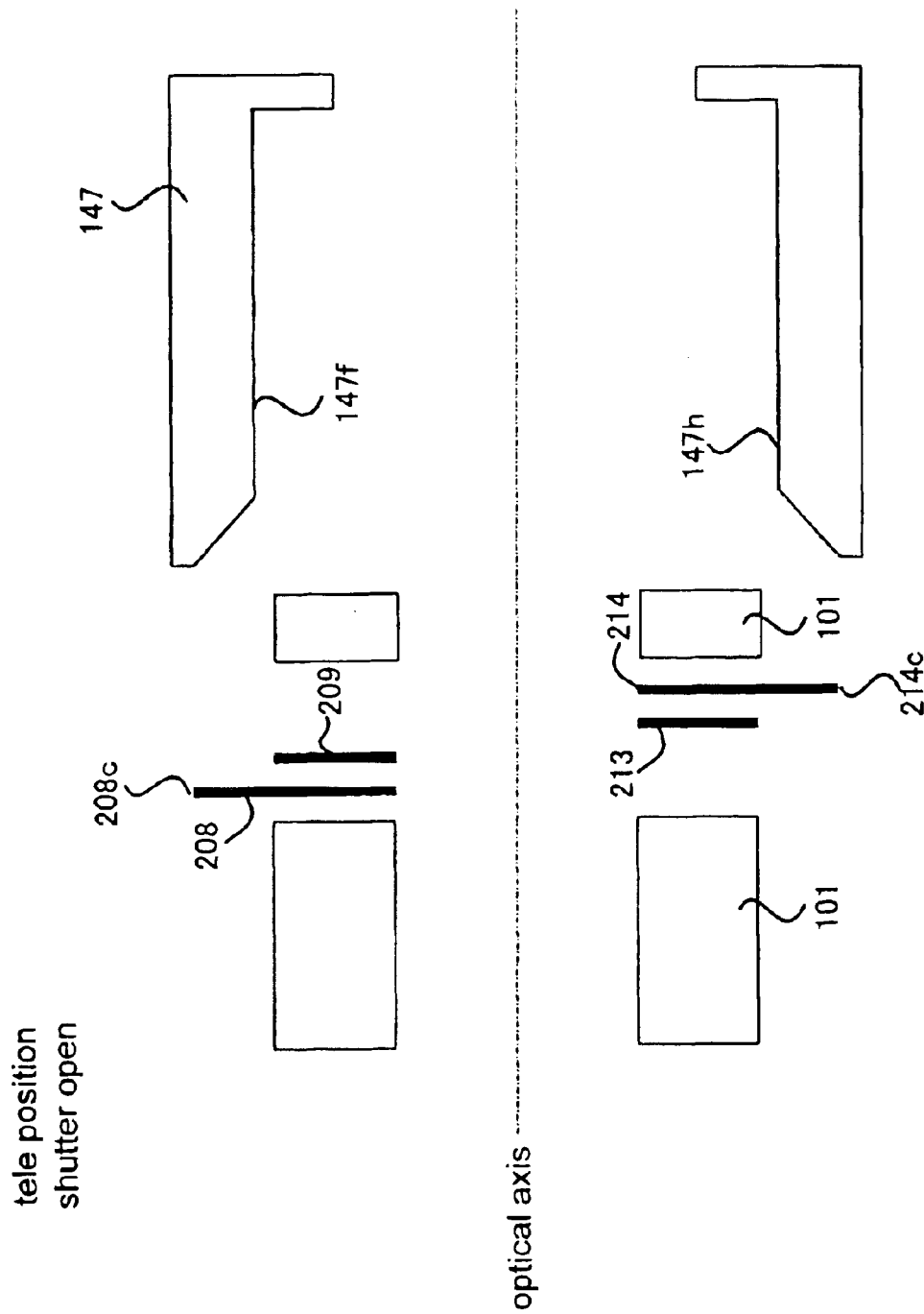
FIG. 28 is a schematic view of the shutter device and the second rectilinear motion tube in the telephoto state when the shutter blades are in the open state.

FIG. 27 is a schematic diagram of the telephoto state when the shutter blades 208, 209, 213 and 214 are in the closed state. In FIG. 27, the shutter device 101 and the second rectilinear motion tube 147 are positioned away from one another with respect to the direction of the optical axis. When the shutter blades 208, 209, 213 and 214 are opened in this situation, the shutter blades will be completely opened, as shown in FIG. 28. Here, the abutting protrusions 208c and 214c of the shutter blades do not abut against the catching portion 147f and 147h of the second rectilinear motion tube 147.

A shutter blade catching face 147g at the front end of the second rectilinear motion tube 147 is slanted such that it faces the optical axis side. Thus, even if the second rectilinear motion tube 147 is drawn close to and collides with the shutter blades while the shutter blades are in the open state, the shutter blades will be guided by the oblique surface of the shutter blade catching face 147g, thereby forcing them to close.

If the shutter blades are still opened when the second rectilinear motion tube 147 collides with the shutter blades, there is the risk that an excessive load is applied to the shutter blades and they break. With this embodiment, however, the shutter blades are shifted in a direction closing them with the shutter blade catching face 147g as explained above, so that no excessive load will be applied to the shutter blades. Furthermore, even when the second rectilinear motion tube 147 collides with the shutter blades, they are shifted in a closing direction, so that the shutter blades can be opened and closed.

Figure 29:
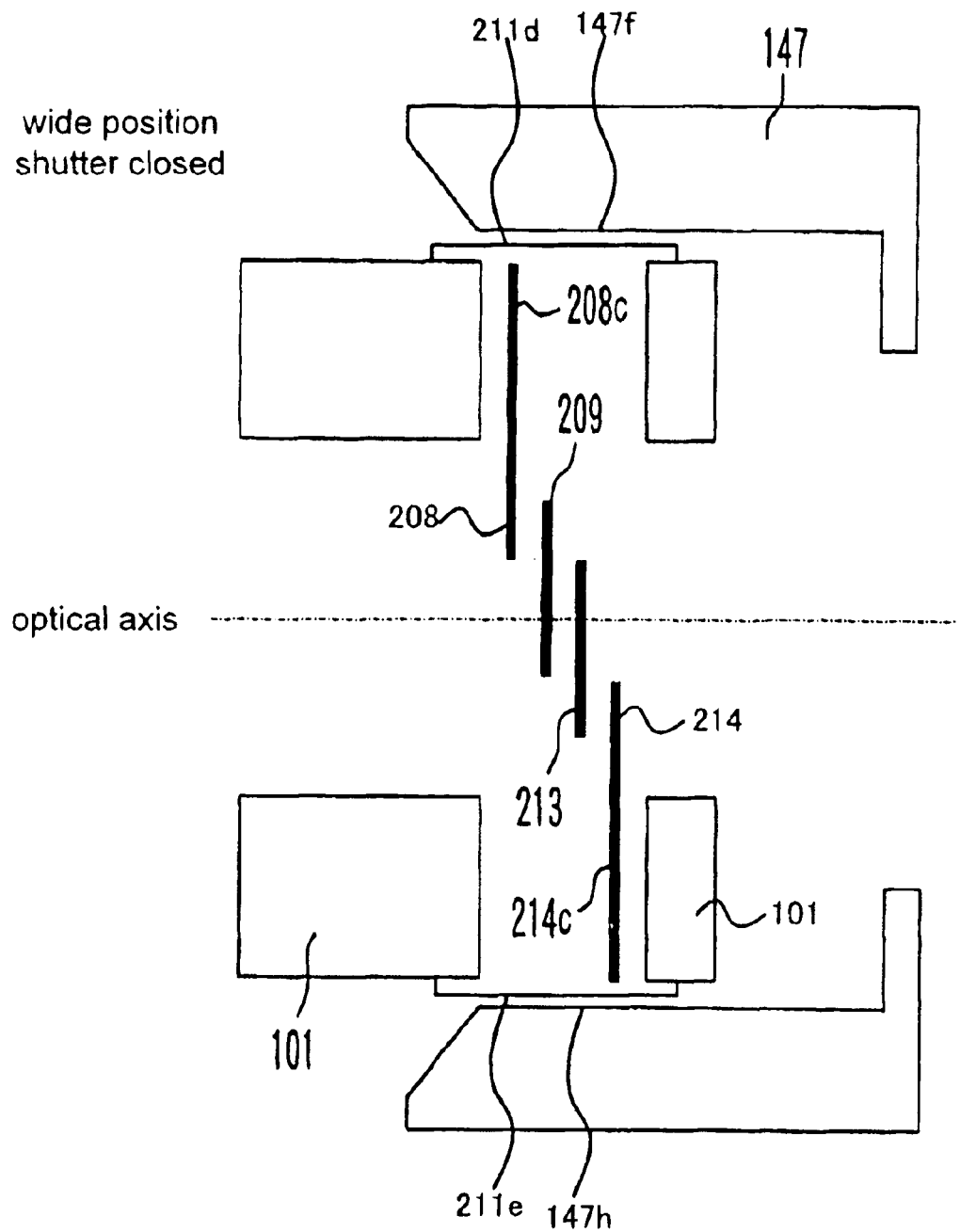
FIG. 29 is a schematic view of the shutter device and the second rectilinear motion tube in the wide-angle state when the shutter blades are in the closed state.

Then, when the wide-angle state is assumed as shown in FIG. 29, the distance between the shutter device 101 and the second rectilinear motion tube 147 in the direction of the optical axis becomes close, and the second rectilinear motion tube 147 is positioned around the shutter device 101. That is to say, the catching portions 147f and 147h of the second rectilinear motion tube 147 are positioned in a direction passing perpendicular through the optical axis and through the cut-outs 211d and 211e (that is, behind the cut-outs 211d and 211e when viewed from the optical axis).

Figure 30:
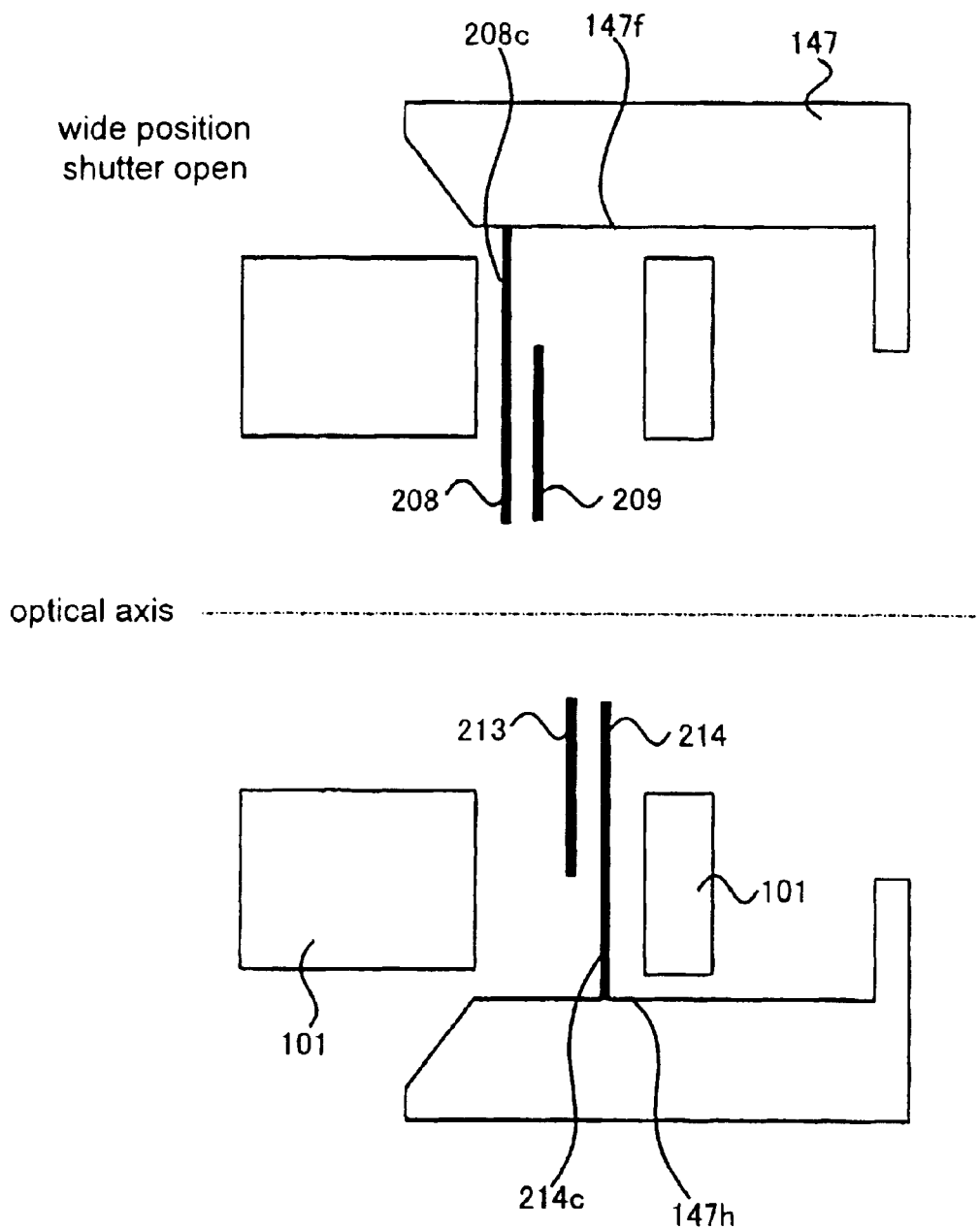
FIG. 30 is a schematic view of the shutter device and the second rectilinear motion tube in the wide-angle state when the shutter blades are in the open state.

When attempting to open the shutter blades in the wide-angle state shown in FIG. 29, the abutting protrusions 208c and 214c of the shutter blades respectively abut against the catching portions 147f and 147h of the second rectilinear motion tube 147, as shown in FIG. 30. Thus, the shutter blades are stopped midway before opening completely, and the aperture diameter of the shutter blades becomes smaller than the aperture diameter in the telephoto state.

With this embodiment, the second rectilinear motion tube 147, which guides the shutter device 101 in the direction of the optical axis, is used as a member for blocking the opening motion of the shutter blades, and it is not necessary to use a separate member dedicated to this purpose as in the related art, so that the number of components is not increased, and the aperture diameter of the shutter blades in the wide-angle state and the telephoto state can be switched. It should be noted that it is also possible to use another body structural member of the lens barrel besides the second rectilinear motion tube 147 as the member for blocking the opening motion of the shutter blades.

In this embodiment, two abutting protrusions 208c and 214c formed on two of the shutter blades abut against the catching portion 147f and 147 of the second rectilinear motion tube 147. Therefore, it is possible to distribute the force with which the shutter blades collide with the second rectilinear motion tube 147 during the opening and closing motion of the shutter blades better than when only one abutting protrusion abuts against the catching portion, and thus it can be prevented that an excessive load is applied to a portion of the second rectilinear motion tube 147.

Embodiment 2

Figure 31:
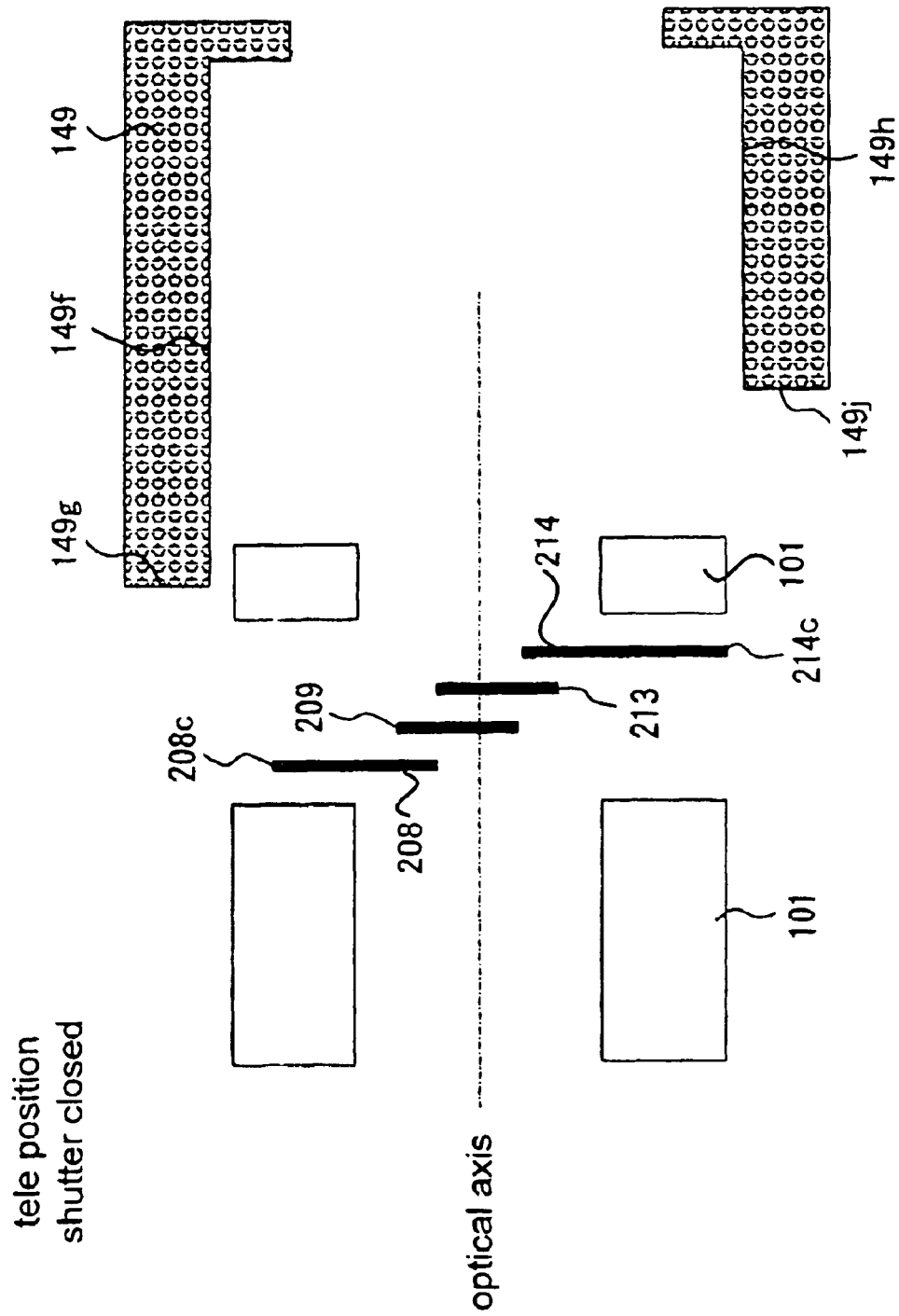
FIG. 31 is a schematic view of the shutter device and the second rectilinear motion tube of Embodiment 2 in the telephoto state when the shutter blades are in the closed state.
Figure 32:
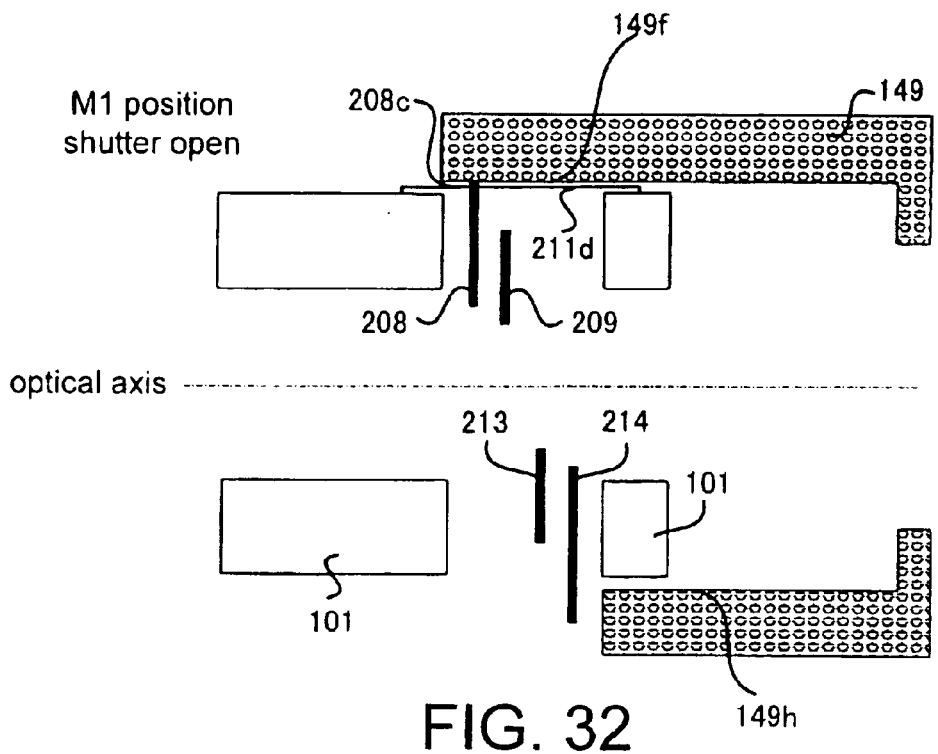
FIG. 32 is a schematic view of the shutter device and the second rectilinear motion tube of Embodiment 2 in the middle state when the shutter blades are in the open state.
Figure 33:
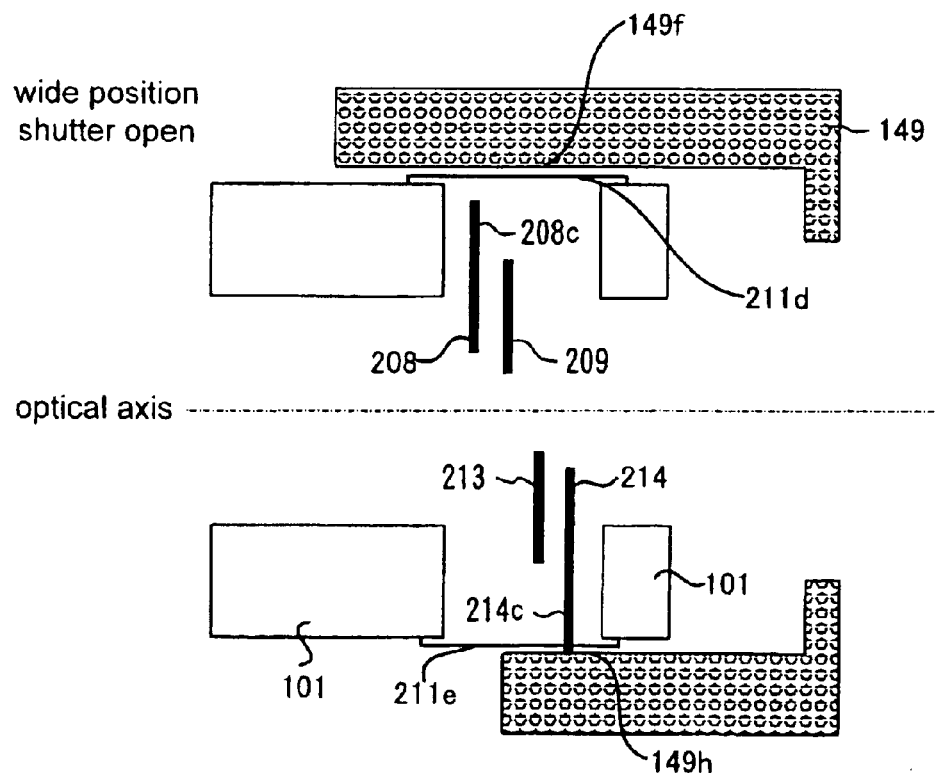
FIG. 33 is a schematic view of the shutter device and the second rectilinear motion tube of Embodiment 2 in the wide-angle state when the shutter blades are in the open state.

Referring to FIGS. 31 to 34, the following is an explanation of Embodiment 2 of the present invention. Here, FIGS. 31 to 33 are schematic diagrams illustrating the switching operation of the aperture diameter of the shutter blades of this embodiment, and show the shutter device 101 and the second rectilinear motion tube 149 in a simplified fashion. Other body structural members of the lens barrel and the configuration of the camera body are the same as in Embodiment 1.

FIG. 31 is a schematic diagram of the telephoto state when the shutter blades 208, 209, 213 and 214 are in the closed state. In FIG. 31, the second rectilinear motion tube 149 is positioned further to the image plane side than the shutter device 101.

The first catching portion 149f and the second catching portion 149h of the second rectilinear motion tube 149 are the same distance from the optical axis. Furthermore, the first catching portion 149f extends further in the direction of the optical axis than the second catching portion 149h. An end face 149g of the first catching portion 149f is positioned further on the object side than an end face 149j of the second catching portion 149h. It should be noted that the end face 149g may also be slanted like the shutter blade catching faces in Embodiment 1.

The abutting protrusion 208c of the first shutter blade 208 is formed shorter than the abutting protrusion 214c of the fourth shutter blade 214, and protrudes for a smaller amount from the shutter device 101.

When the shutter blades perform an opening motion in the telephoto state shown in FIG. 31, the shutter blades will be completely opened. In this case, the abutting protrusions of 208c and 214c of the shutter blades do not abut against the catching portions 149f and 149h of the second rectilinear motion tube 149.

On the other hand, when switching, with a zooming operation of the lens barrel, from the telephoto state shown in FIG. 31 to the M1 state shown in FIG. 32, the shutter device 101 and the second rectilinear motion tube 149 are moved relative to one another in the direction of the optical axis, and the spacing between the two is narrowed. In this situation, the first catching portion 149f of the second rectilinear motion tube 149 is positioned in a direction passing perpendicular through the optical axis and through the cut-out 211d. Thus, when attempting to open the shutter blades, the abutting protrusion 208c of the first shutter blades 208 abut against the first catching portion 149f.

It should be noted that the drive pin 151 has moved from the position 143b18 to the position 143b6, as shown in FIG. 8.

Here, the open-close motion of the four shutter blades is performed by rotation of the shutter rotor 205, and when the opening motion of one of the shutter blades is obstructed, the opening motion of all shutter blades will be obstructed.

Thus, the opening motion of the first shutter blade 208 is obstructed. Consequently, the aperture diameter in the M1 state is smaller than the aperture diameter in the telephoto state. Here, the second catching portion 149h of the second rectilinear motion tube 149 is not in a position that occludes the cut-out 211e, so that the second abutting protrusion 214c of the fourth shutter blade 214 does not abut against the second catching portion 149h.

When switching with a zooming operation from the M1 state shown in FIG. 32 to the wide-angle state shown in FIG. 33, the spacing between the shutter device 101 and the second rectilinear motion tube 149 is narrowed even further than in the state shown in FIG. 32. In this situation, the first catching portion 149f of the second rectilinear motion tube 149 is positioned in a direction passing perpendicular through the optical axis and through the cut-out 211d, and the second catching portion 149h is positioned in a direction passing perpendicular through the optical axis and through the cut-out 211e.

It should be noted that the drive pin 151 has moved from the position 143b6 to the position 143b2, as shown in FIG. 8. Furthermore, as shown in FIG. 10, the group 1 helicoid 145a has moved to the position 144b2 and the group 2 cam pins 148a have moved to the position 144c2.

Figure 34:
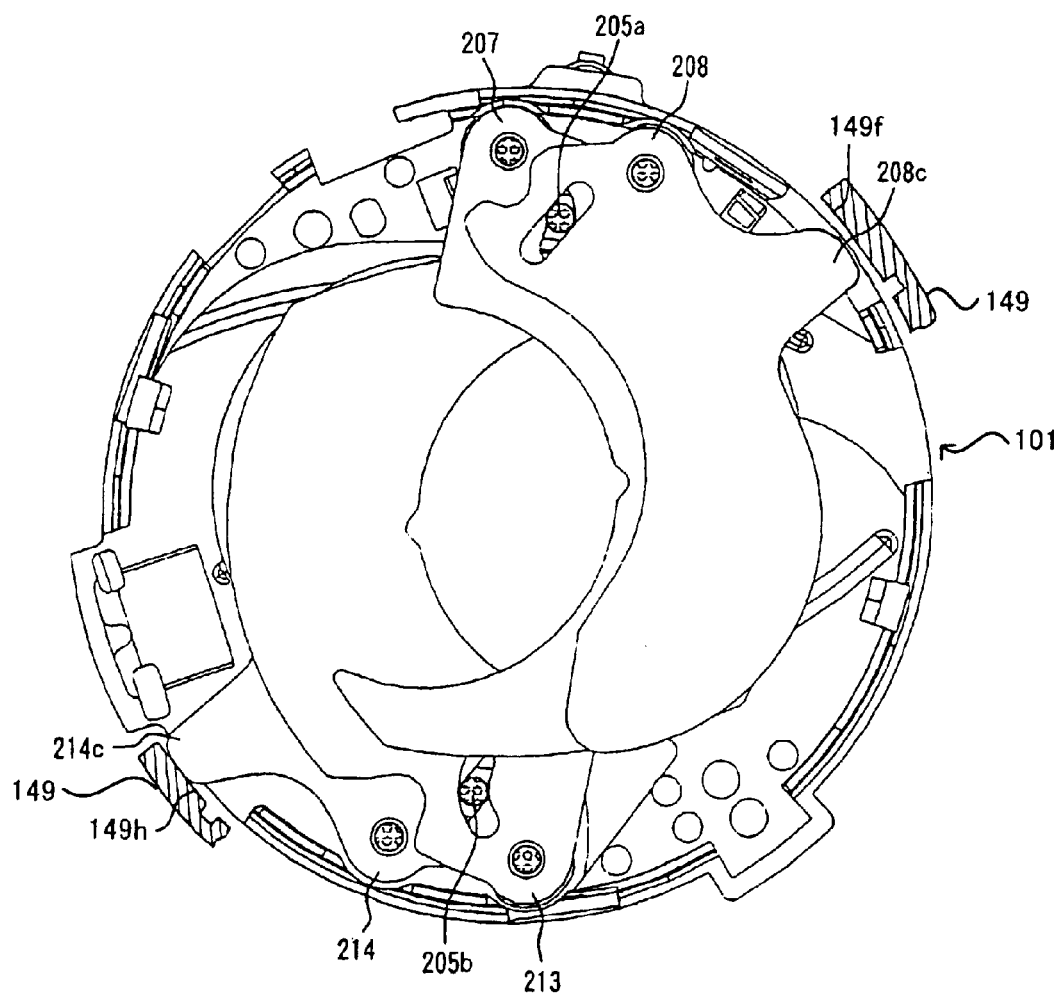
FIG. 34 is a diagram illustrating the arrangement of the shutter blades in Embodiment 2 when the shutter blades are in the open state.

When attempting to open the shutter blades in the wide-angle state, the abutting protrusion 214c of the fourth shutter blade 214 abuts against the second catching portion 149h. Thus, the opening motion of the shutter blades is obstructed. Here, the abutting protrusion 214c is longer than the abutting protrusion 208c, so that the aperture diameter of the shutter blades becomes smaller than the aperture diameter in the M1 state. Furthermore, since the abutting protrusion 208c is shorter than the abutting protrusion 214c, it does not abut against the first catching portion 149f. FIG. 34 is a front view of the shutter device in the wide-angle state.

With this embodiment, in which the abutting protrusions 208c and 214c have different lengths and the catching portions 149f and 149h have different lengths in the direction of the optical axis, the aperture diameter of the shutter blades is respectively different for the three zoom positions telephoto, M1 and wide, because the abutting state of the abutting protrusions 208c and 214c and the catching portions 149f and 149h is different depending on the relative position of the shutter device 101 and the second rectilinear motion tube 149.

In this embodiment, the aperture diameter of the shutter blades is switched by obstructing the opening motion of the shutter blades using the second rectilinear motion tube 149, which is a body structural member of the lens barrel, so that it is not necessary to use a separate component dedicated to the purpose of changing the aperture diameter of the shutter blades as in the related art, making it possible to prevent the lens barrel and the camera itself from becoming larger and more costly.

Moreover, in this embodiment, the abutting state of the abutting protrusions 208c and 214c, which are of different lengths, and the first and second catching portions 149f and 149h, which are of different lengths in the direction of the optical axis, is switched depending on the relative position of the shutter device 101 and the second rectilinear motion tube 149, making it possible to switch to an aperture diameter in accordance with each of a plurality of zoom positions.

Embodiment 3

Figure 35:
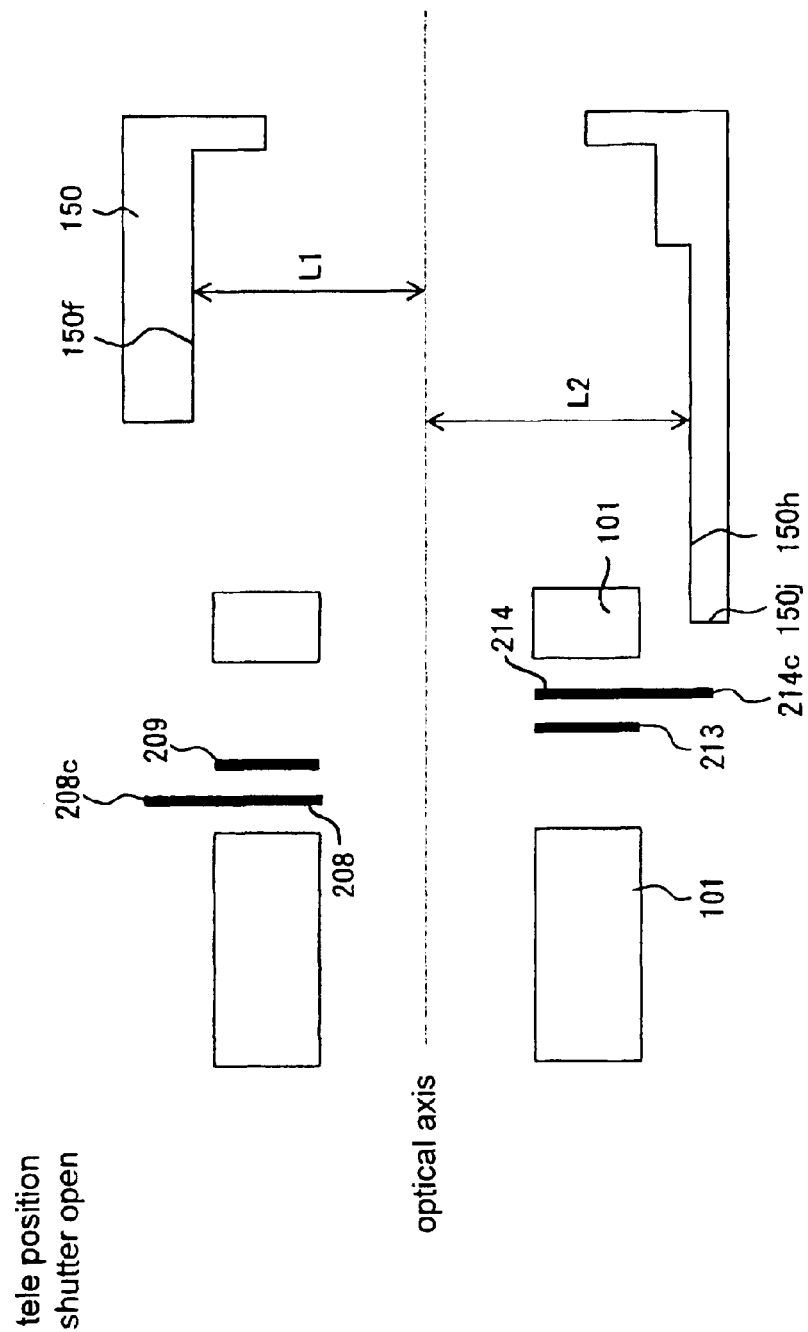
FIG. 35 is a schematic view of the shutter device and the second rectilinear motion tube of Embodiment 3 in the telephoto state when the shutter blades are in the open state.
Figure 36:
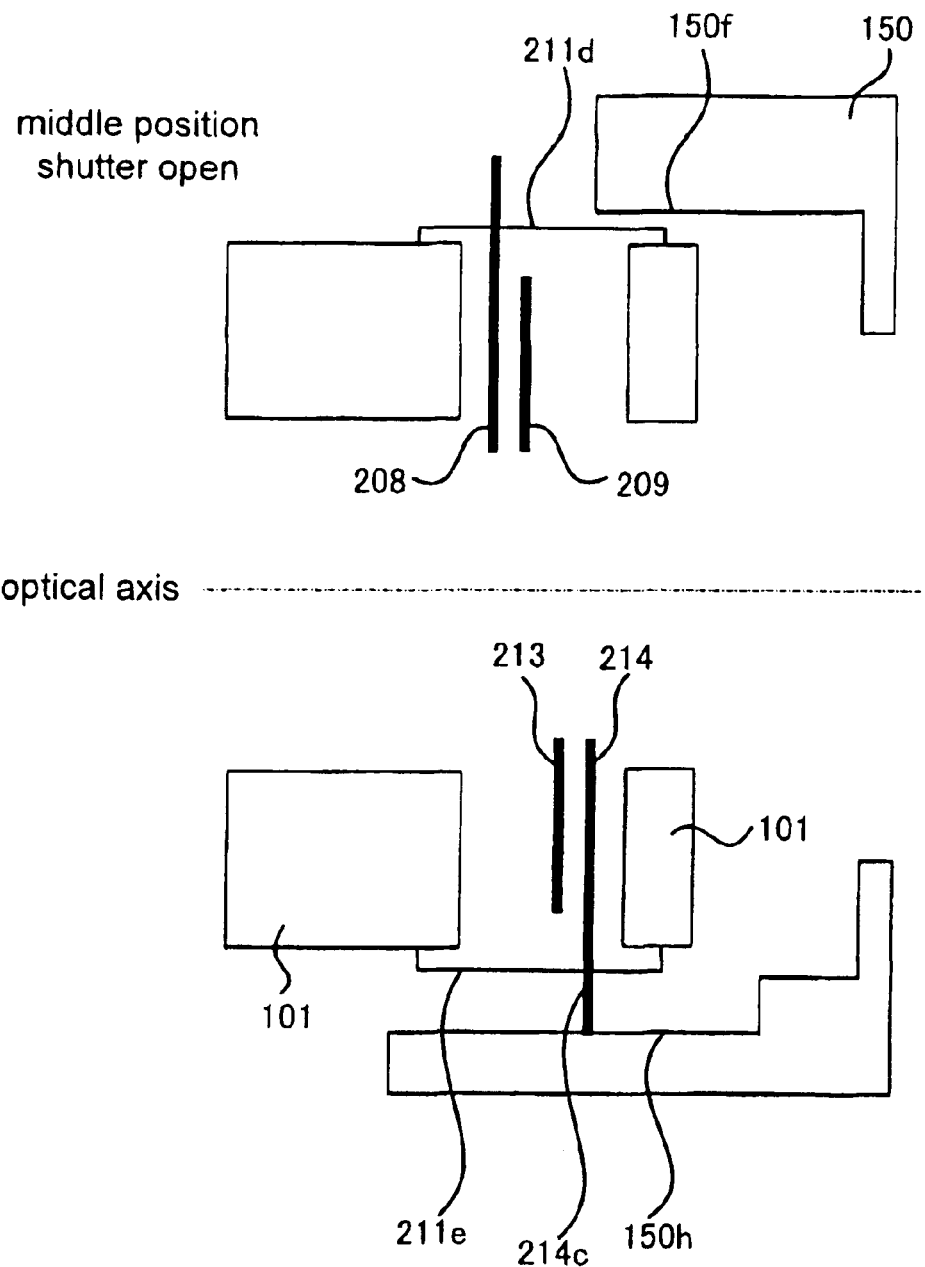
FIG. 36 is a schematic view of the shutter device and the second rectilinear motion tube of Embodiment 3 in the middle state when the shutter blades are in the open state.
Figure 37:
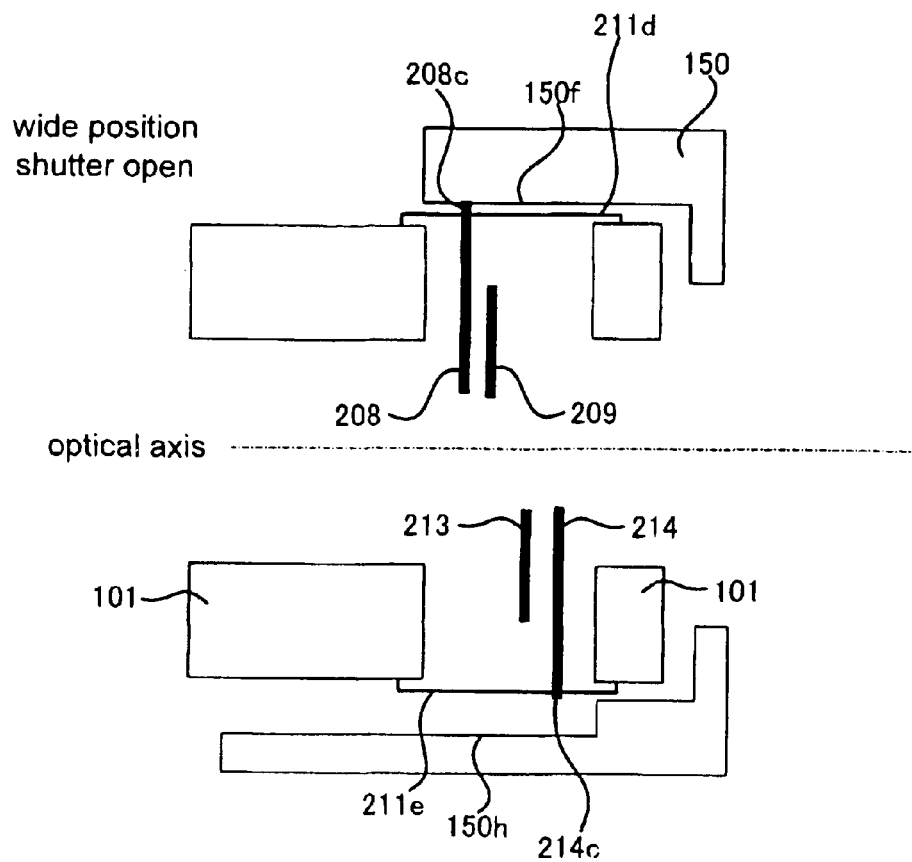
FIG. 37 is a schematic view of the shutter device and the second rectilinear motion tube of Embodiment 3 in the wide-angle state when the shutter blades are in the open state.

Referring to FIGS. 35 to 37, the following is an explanation of Embodiment 3 of the present invention. Here, FIGS. 35 to 37 are schematic diagrams illustrating the switching operation of the aperture diameter of the shutter blades in this embodiment, and show the shutter device 101 and a second rectilinear motion tube 150 in a simplified fashion. Other body structural members of the lens barrel and the configuration of the camera body are the same as in Embodiment 1.

FIG. 35 is a schematic diagram of the telephoto state when the shutter blades 208, 209, 213 and 214 are in the open state. In FIG. 35, the second rectilinear motion tube 150 is positioned further to the image plane side than the shutter device 101.

The second catching portion 150h of the second rectilinear motion tube 150 is formed longer in the direction of the optical axis than the first catching potion 150f. Moreover, a step is formed at the inner circumferential surface of the second catching portion 150h, and at the front region the distance (L2) from the optical axis to the second catching portion 150h is larger than the distance (L1) from the optical axis to the first catching portion 150f.

It should be noted that the abutting protrusion 208c of the first shutter blade 208 and the abutting protrusion 214c of the fourth shutter blade 214 have the same length.

When the shutter blades perform the opening motion in the telephoto state shown in FIG. 35, the shutter blades will be completely opened. In this case, the abutting protrusions of 208c and 214c of the shutter blades do not abut against the catching portions 150f and 150h of the second rectilinear motion tube 150.

On the other hand, when switching, with a zooming operation of the lens barrel, from the telephoto state shown in FIG. 35 to the middle state shown in FIG. 36, the shutter device 101 and the second rectilinear motion tube 150 are moved relative to one another in the direction of the optical axis, and the spacing between the two is narrowed. In this situation, the front region of the second catching portion 150h is positioned in a direction passing perpendicular through the optical axis and through the cut-out 211e, and when attempting to open the shutter blades, the abutting protrusion 214c of the fourth shutter blade 214 abuts against the second catching portion 150h.

Thus, the opening motion of the shutter blades is obstructed, and the aperture diameter in this situation will be smaller than the aperture diameter in the telephoto state (FIG. 35). It should be noted that the first catching portion 150f of the second rectilinear motion tube 150 is not in a position occluding the cut-out 211d, so that the abutting protrusion 208c of the first shutter blade 208 does not abut against the first catching portion 150f.

When switching with a zooming operation from the middle state shown in FIG. 36 to the wide-angle state shown in FIG. 37, the spacing between the shutter device 101 and the second rectilinear motion tube 150 is narrowed even further. In this situation, the first catching portion 150f of the second rectilinear motion tube 150 is positioned in a direction passing perpendicular through the optical axis and through the cut-out 211d, and the second catching portion 150h is positioned in a direction passing perpendicular through the optical axis and through the cut-out 211e.

When attempting to open the shutter blades in this state, the abutting protrusion 208c of the first shutter blade 208 abuts against the first catching portion 150f. Thus, the opening motion of the shutter blades is obstructed.

The first catching portion 150f is in a position that is closer to the optical axis than the second catching portion 150h, so that the aperture diameter in the wide-angle state becomes smaller than the aperture diameter in the middle state. Furthermore, since the second catching portion 150h is at a position that is further away from the optical axis than the first catching portion 150f, the abutting protrusion 214c does not abut against the second catching portion 150h.

In this embodiment, the aperture diameter of the shutter blades is switched by obstructing the opening motion of the shutter blades using the second rectilinear motion tube 150, which is a body structural member of the lens barrel, so that it is not necessary to use a separate component dedicated to the purpose of changing the aperture diameter of the shutter blades as in the related art, making it possible to prevent the lens barrel and the camera itself from becoming larger and more costly.

Moreover, in this embodiment, the abutting state of the first catching portion 150f and the second catching portion 150h, which are at different distances from the optical axis and of different lengths in the direction of the optical axis, and the abutting protrusions 208c and 214c is switched depending on the relative position of the shutter device 101 and the second rectilinear motion tube 150, making it possible to switch the aperture diameter in accordance with each of a plurality of zoom positions.

Embodiment 4

Figure 38:
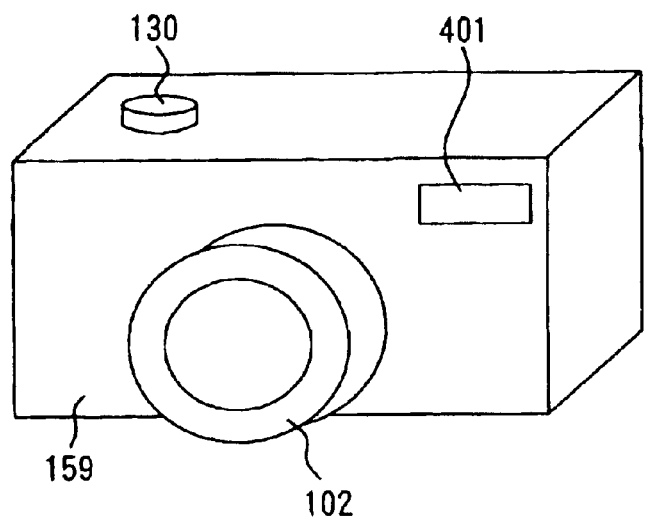
FIG. 38 is an outside perspective view of a camera according to Embodiment 4.
Figure 39:
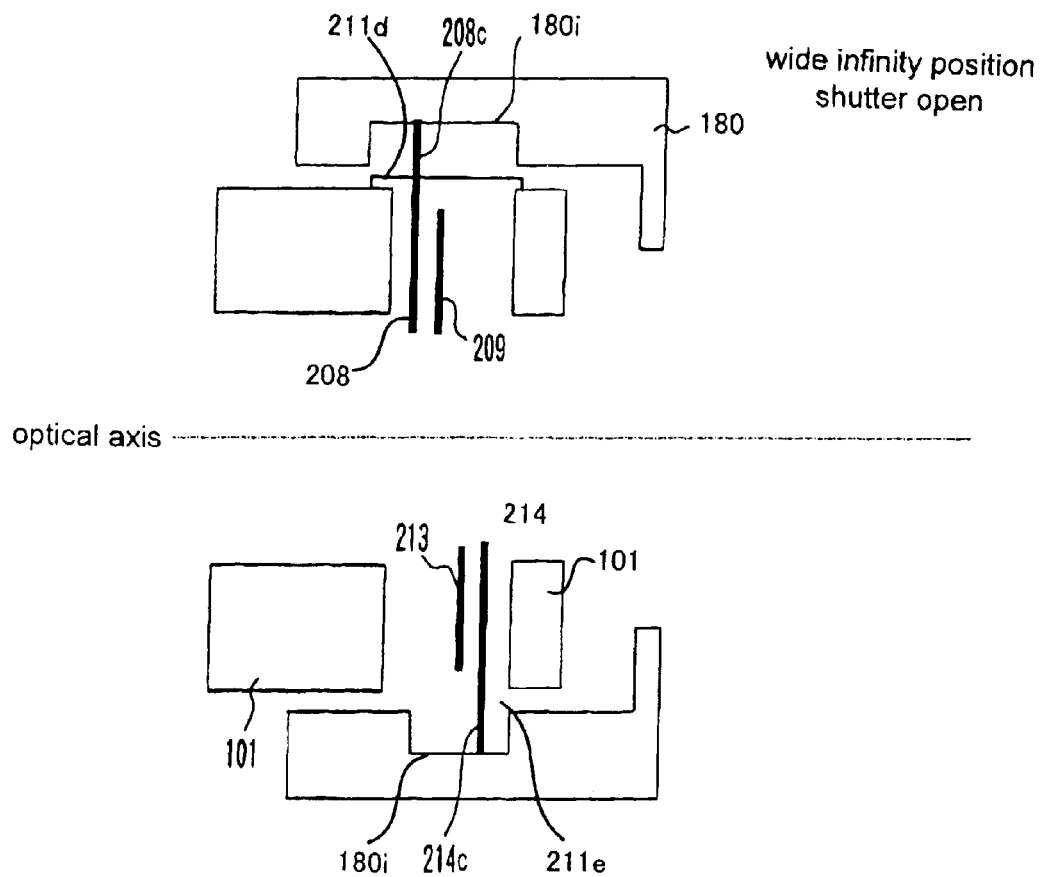
FIG. 39 is a schematic view of the shutter device and the second rectilinear motion tube of Embodiment 4 in the wide infinity state when the shutter blades are in the open state.

Referring to FIGS. 38 to 40, the following is an explanation of Embodiment 4 of the present invention. Here, FIG. 38 is an outside perspective view of a camera of this embodiment, and FIGS. 39 and 40 are schematic diagrams illustrating the switching operation of the aperture diameter for infinity and for close range in the wide-angle state, and show the shutter device 101 and a second rectilinear motion tube 180 in a simplified fashion. Other body structural members of the lens barrel and the configuration of the camera body are the same as in Embodiment 1.

In FIG. 38, the camera body 159 includes an illumination unit 401 that irradiates illumination light onto the object, a lens barrel 102 that can be thrust out and pulled back in with respect to the direction of the optical axis, and a release button 130 that is operated in order to start the image-taking preparation operation and the image-taking operation.

FIG. 39 is a schematic diagram of the lens barrel when the zoom position is wide and the object distance is between infinity and 60 cm (first object distance region).

A recess 180i is formed in the inner circumferential surface of the second rectilinear motion tube 180, at a portion that is roughly in the middle with respect to the direction of the optical axis. Here, the distance from the optical axis at the recess 180i is larger than the distance from the optical axis at the other regions of the second rectilinear motion tube 180.

In the state shown in FIG. 39, the recess 180i is positioned in a direction passing perpendicular through the optical axis and through the cut-outs 211d and 211e of the shutter plate 211. In this case, when the shutter blades are opened, the abutting protrusions 208c and 214c of the shutter blades abut against the recess 108i, thereby obstructing the opening motion of the shutter blades. The aperture diameter of the shutter blades at this time is smaller than the aperture diameter in the telephoto state, in which the opening motion of the shutter blades is not obstructed.

On the other hand, when the zoom position is wide and the object distance is between 60 cm and 20 cm (close range, second object distance range), the second rectilinear motion tube 180 and the shutter device 101 are moved relative to one another in the direction of the optical axis by focusing the lens barrel, so that the spacing between the two is separated and the state shown in FIG. 40.

In this state, the front end region of the second rectilinear motion tube 180 is positioned in a direction passing perpendicular through the optical axis and through the cut-outs 211d and 211e. In this case, when opening the shutter blades, the abutting protrusions 208c and 214c of the shutter blades abut against the front end region of the second rectilinear motion tube 180, and the opening motion of the shutter blades is obstructed. The aperture diameter of the shutter blades at this time is smaller than the aperture diameter in the wide infinity state shown in FIG. 39.

On the other hand, if the lens barrel 102 is in the wide close range state shown in FIG. 40, the microcomputer 113 provided inside the camera body 159 drives the illumination unit 401 when taking an image in response to the camera operator's operating the release button 130.

That is to say, when the shutter device 101 and the second rectilinear motion tube 180 are in the positional relation shown in FIG. 40, and the release button 130 is pressed down to the second stroke, then the microcomputer 113 causes the shutter blades to perform an open-close motion while letting the illumination unit 401 emit light at the same time.

With this embodiment, by forming the recess 180i in the internal circumferential surface of the second rectilinear motion tube 180. The aperture diameter of the shutter blades at infinity and close range can be switched by changing the relative position of the shutter device 101 and the second rectilinear motion tube 180 in accordance with the object distance (infinity and close range) at the wide-angle state.

Then, when taking an image in the wide close range state, the aperture diameter of the shutter blades is made smaller than the aperture diameter in the wide infinity state, and the illumination unit 401 is caused to emit light during the open-close motion of the shutter blades. Thus, the exposure time becomes shorter than that in the state that the aperture diameter is made greater without emitting the illumination unit 401, and photographic imaging with little fuzziness and camera shake becomes possible.

While preferred embodiments have been described, it is to be understood that modification and variation of the present invention may be made without departing from the scope of the following claims.

What is claimed is:

1. A lens apparatus, comprising:
   a lens unit that can be moved in a direction of an optical axis;
   a light-blocking unit having a plurality of light-blocking members forming an aperture portion through which light passes; and
   a body structural member constituting a portion of a main body of the lens apparatus;
   wherein the light-blocking unit and the body structural member are moved relative to one another in the direction of the optical axis in accordance with a movement of the lens unit; and
   wherein an aperture diameter of the aperture portion is switched by moving the body structural member between a first position in which the light-blocking members are prevented from opening beyond a predetermined aperture diameter, and a second position in which the light-blocking members are allowed to open beyond the predetermined aperture diameter.

2. The lens apparatus according to claim 1,
   wherein at least one of the plurality of light-blocking members comprises a protrusion that protrudes out of the light-blocking unit when that light-blocking member is opened beyond the predetermined aperture diameter; and
   wherein, when the body structural member is in the first position, the light-blocking members are prevented from opening beyond the predetermined aperture diameter by the body structural member abutting against the protrusion.

3. The lens apparatus according to claim 2,
   wherein the light-blocking unit comprises a first light-blocking member having a first protrusion extending in a direction perpendicular to the optical axis, and a second light-blocking member having a second protrusion that is longer than the first protrusion in the direction perpendicular to the optical axis; and wherein the body structural member comprises:

a first contact portion which extends in the direction of the optical axis and which is abutted by the first protrusion when the body structural member is in the first position; and a second contact portion, which is shorter in the direction of the optical axis than the first contact portion and which can be abutted by the second protrusion when the body structural member is in the second position.

4. The lens apparatus according to claim 2, wherein the body structural member has a substantially cylindrical shape;

wherein at least one of the light-blocking members has a curvature at the tip of the protrusion, and the curvature radius at that tip is smaller than the curvature radius of the body structural member.

5. The lens apparatus according to claim 1, wherein the body structural member comprises a first contact portion and a second contact portion, which extend in the direction of the optical axis and which is abutted by different light-blocking members of the plurality of light-blocking members, respectively when the body structural member is in the first position; and wherein the second contact portion is longer than the first contact portion in the direction of the optical axis, and is disposed further away from the optical axis than the first contact portion at a region at the front of the second contact portion.

6. The lens apparatus according to claim 1, wherein a front end portion of the body structural member has a slanted surface that faces the optical axis.

7. The lens apparatus according to claim 1, wherein a plurality of reflection suppressing projections that suppress reflection of light toward an image plane side are formed in an inner circumferential surface of the body structural member; and wherein the reflection suppressing projections that are formed in regions against which the light-blocking members abut extend in a direction that obliquely intersects with a plane in which the light-blocking members move.

8. The lens apparatus according to claim 1, wherein the body structural member guides the light-blocking unit in the direction of the optical axis.

9. A camera, comprising:

a lens apparatus according to claim 1;

an image pickup device that receives light that has passed through the aperture portion formed by the plurality of light-blocking members and photoelectrically converts an image formed by the lens apparatus.

10. The camera according to claim 9, further comprising a control circuit that controls a drive of an illumination unit that irradiates illumination light onto an object;

wherein the lens apparatus switches the aperture diameter of the aperture portion in a first object distance region to the smaller aperture diameter in a second object distance region in a predetermined zoom position by changing a relative position between the light-blocking unit and the body structural member; and wherein the control circuit lets the illumination unit irradiate the illumination light when an image is taken at the second object distance region.

* * * * *

UNITED STATES PATENT AND TRADEMARK OFFICE
CERTIFICATE OF CORRECTION

PATENT NO. : 6,771,897 B2
DATED : August 3, 2004
INVENTOR(S) : Shinichi Masuda

It is certified that error appears in the above-identified patent and that said Letters Patent is hereby corrected as shown below:

Column 11,
Line 5, delete "is In the" and insert -- is in the --.

Signed and Sealed this

Seventh Day of March, 2006

JON W. DUDAS
*Director of the United States Patent and Trademark Office*